United States Patent
Kim et al.

(10) Patent No.: US 10,120,544 B2
(45) Date of Patent: Nov. 6, 2018

(54) CHART SELECTION TOOLTIP

(71) Applicant: salesforce.com, inc., San Francisco, CA (US)

(72) Inventors: Yuseung Kim, San Jose, CA (US); Jean Elie Bovet, Los Angeles, CA (US)

(73) Assignee: salesforce.com, inc., San Francisco, CA (US)

( * ) Notice: Subject to any disclaimer, the term of this patent is extended or adjusted under 35 U.S.C. 154(b) by 374 days.

(21) Appl. No.: 14/665,222

(22) Filed: Mar. 23, 2015

(65) Prior Publication Data

US 2016/0103581 A1    Apr. 14, 2016

Related U.S. Application Data

(60) Provisional application No. 62/062,722, filed on Oct. 10, 2014.

(51) Int. Cl.
| | |
|---|---|
| *G06F 3/0481* | (2013.01) |
| *G06F 3/0484* | (2013.01) |
| *G06F 3/0482* | (2013.01) |
| *G06T 11/20* | (2006.01) |

(52) U.S. Cl.
CPC ........ *G06F 3/04842* (2013.01); *G06F 3/0481* (2013.01); *G06F 3/0482* (2013.01); *G06T 11/206* (2013.01)

(58) Field of Classification Search
CPC ... G06F 3/0481; G06F 3/0482; G06F 3/04842
See application file for complete search history.

(56) References Cited

U.S. PATENT DOCUMENTS

| | | | | |
|---|---|---|---|---|
| 5,297,253 A | * | 3/1994 | Meisel | G06F 17/30716 345/440 |
| 5,577,188 A | | 11/1996 | Zhu | |
| 5,608,872 A | | 3/1997 | Schwartz | |

(Continued)

OTHER PUBLICATIONS

U.S. Appl. No. 13/998,890.
U.S. Appl. No. 13/998,065.
U.S. Appl. No. 13/986,251.

*Primary Examiner* — William Bashore
*Assistant Examiner* — Nathan Shrewsbury
(74) *Attorney, Agent, or Firm* — Dergosits & Noah LLP; Todd A. Noah

(57) ABSTRACT

Some embodiments of the present invention include an apparatus for enabling a tooltip to view information associated with portions of charts displayed on a display screen of a mobile computing device and include a processor, and one or more stored sequences of instructions which, when executed by the processor, cause the processor to display information associated with a chart on a display screen of a mobile computing system using a first chart type, the information including label information and value information Based on detecting a selection of a portion of the chart, cause the tooltip to be displayed on the display screen of the mobile computing system, the tooltip displaying label information and value information associated with the selected portion of the chart, the tooltip including a navigation tool to enable navigating and updating the tooltip with label information and value information associated with different portions of the chart.

20 Claims, 31 Drawing Sheets

(56) References Cited

U.S. PATENT DOCUMENTS

| | | |
|---|---|---|
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,256,030 B1* | 7/2001 | Berry .................. G06F 3/0489 715/854 |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,995,768 B2* | 2/2006 | Jou .................. G06F 9/542 345/440 |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,512,875 B2* | 3/2009 | Davis .................. G06F 17/2247 345/440 |
| 7,620,655 B2 | 11/2009 | Larsson |
| 7,698,160 B2 | 4/2010 | Beaven et al. |
| 7,779,475 B2 | 8/2010 | Jakobson et al. |
| 7,797,226 B2* | 9/2010 | Ram .................. G06F 17/246 705/35 |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,190,992 B2* | 5/2012 | Tien .................. G06Q 30/00 715/243 |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,930,253 B1* | 1/2015 | Ball .................. G06Q 40/00 705/35 |
| 9,239,670 B2* | 1/2016 | Dewan .................. G06F 3/04842 |
| 2001/0044791 A1 | 11/2001 | Richter et al. |
| 2002/0070953 A1* | 6/2002 | Barg .................. G06Q 10/10 715/700 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0078430 A1* | 4/2004 | Aubert .................. G06Q 10/06 709/204 |
| 2004/0128001 A1 | 7/2004 | Levin et al. |
| 2004/0164983 A1* | 8/2004 | Khozai .................. G06T 11/206 345/440 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0240756 A1* | 10/2005 | Mayer .................. G06F 9/4418 713/2 |
| 2006/0070013 A1* | 3/2006 | Vignet .................. G06T 11/206 715/854 |
| 2007/0203816 A1* | 8/2007 | Costache .................. G06Q 40/00 705/35 |
| 2008/0155464 A1* | 6/2008 | Jones .................. G06F 3/0481 715/787 |
| 2009/0063415 A1 | 3/2009 | Chatfield et al. |

(56) References Cited

U.S. PATENT DOCUMENTS

| | | |
|---|---|---|
| 2009/0100342 A1 | 4/2009 | Rueben et al. |
| 2009/0177744 A1 | 7/2009 | Marlow et al. |
| 2009/0231275 A1* | 9/2009 | Odgers .................. G06F 1/162 |
| | | 345/157 |
| 2010/0005411 A1* | 1/2010 | Duncker .......... G06F 17/30873 |
| | | 715/769 |
| 2011/0321003 A1* | 12/2011 | Doig ........................ G06F 8/34 |
| | | 717/107 |
| 2012/0162265 A1* | 6/2012 | Heinrich .......... G06Q 10/06393 |
| | | 345/661 |
| 2012/0233137 A1 | 9/2012 | Jakobson et al. |
| 2013/0097490 A1* | 4/2013 | Kotler .................... G06F 17/21 |
| | | 715/255 |
| 2013/0166578 A1* | 6/2013 | Papineni .......... G06F 17/30994 |
| | | 707/755 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0157142 A1* | 6/2014 | Heinrich ............. H04L 67/1095 |
| | | 715/744 |
| 2014/0324779 A1* | 10/2014 | Forbes ............. G06F 17/30575 |
| | | 707/634 |
| 2014/0359537 A1 | 12/2014 | Jakobson et al. |
| 2014/0380158 A1* | 12/2014 | Kapahi ................. G06F 3/0481 |
| | | 715/711 |
| 2015/0007050 A1 | 1/2015 | Jakobson et al. |
| 2015/0007080 A1* | 1/2015 | Nama ................... G06F 3/0484 |
| | | 715/771 |
| 2015/0229546 A1* | 8/2015 | Somaiya ............. H04L 43/045 |
| | | 715/736 |
| 2015/0237085 A1* | 8/2015 | Duncker ................ H04L 67/02 |
| | | 715/753 |
| 2016/0055232 A1* | 2/2016 | Yang .................... G06T 11/206 |
| | | 707/740 |

* cited by examiner

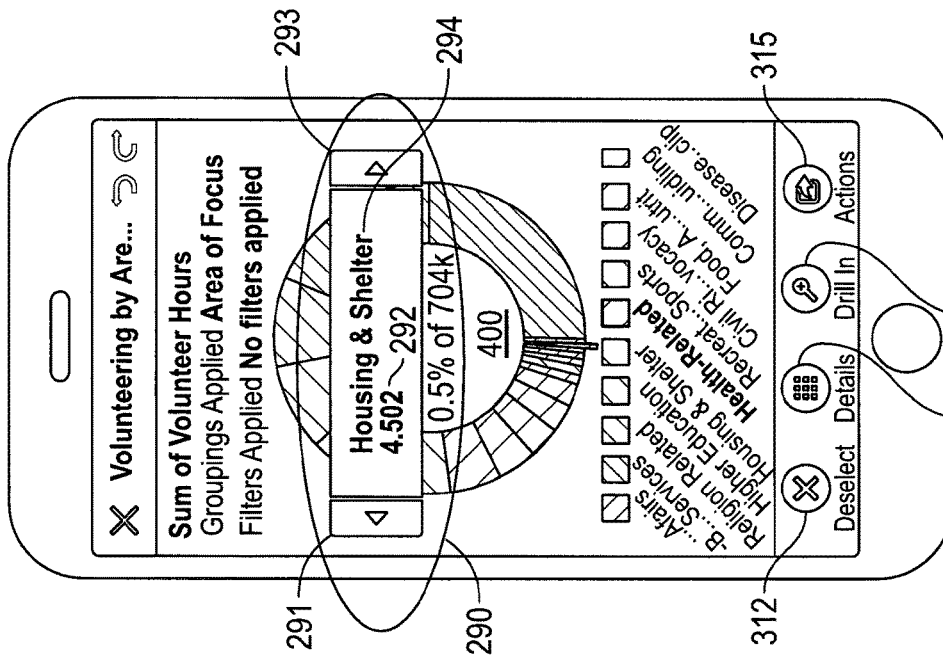
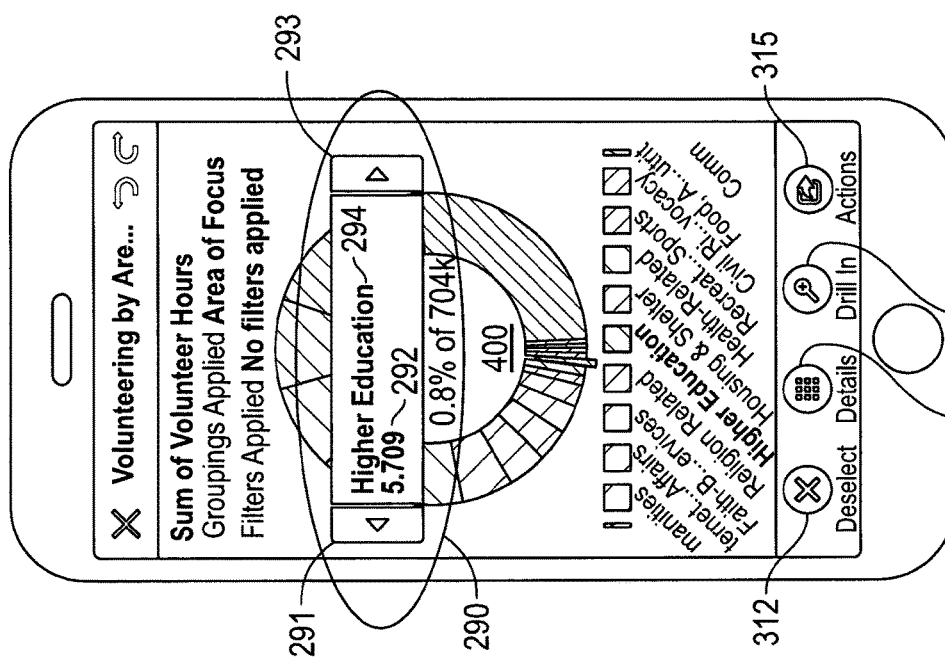
FIG. 4C
FIG. 4D

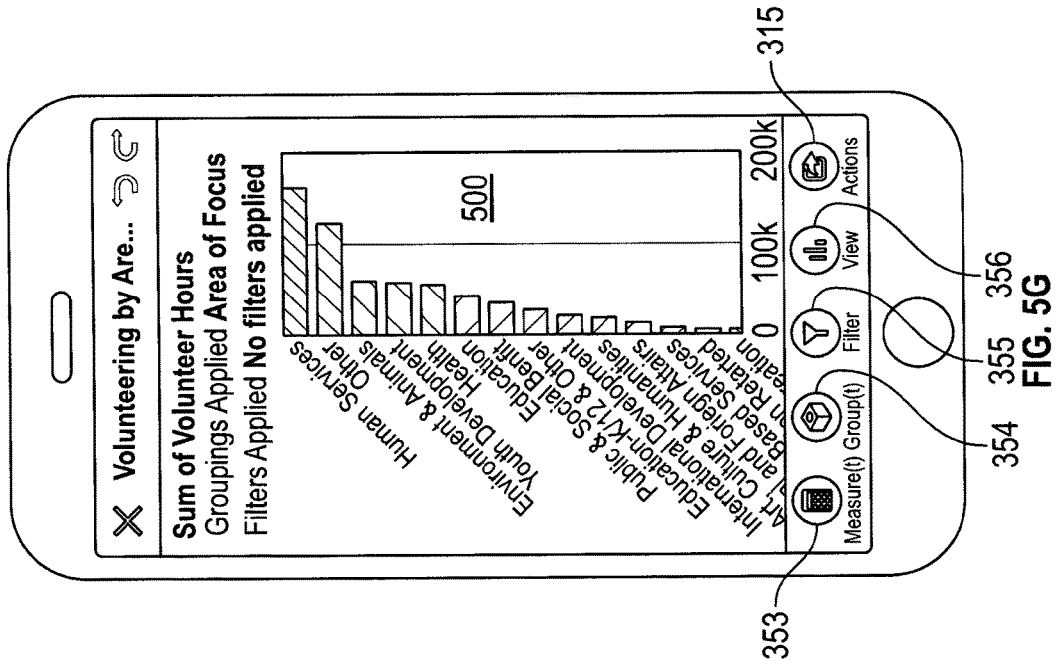
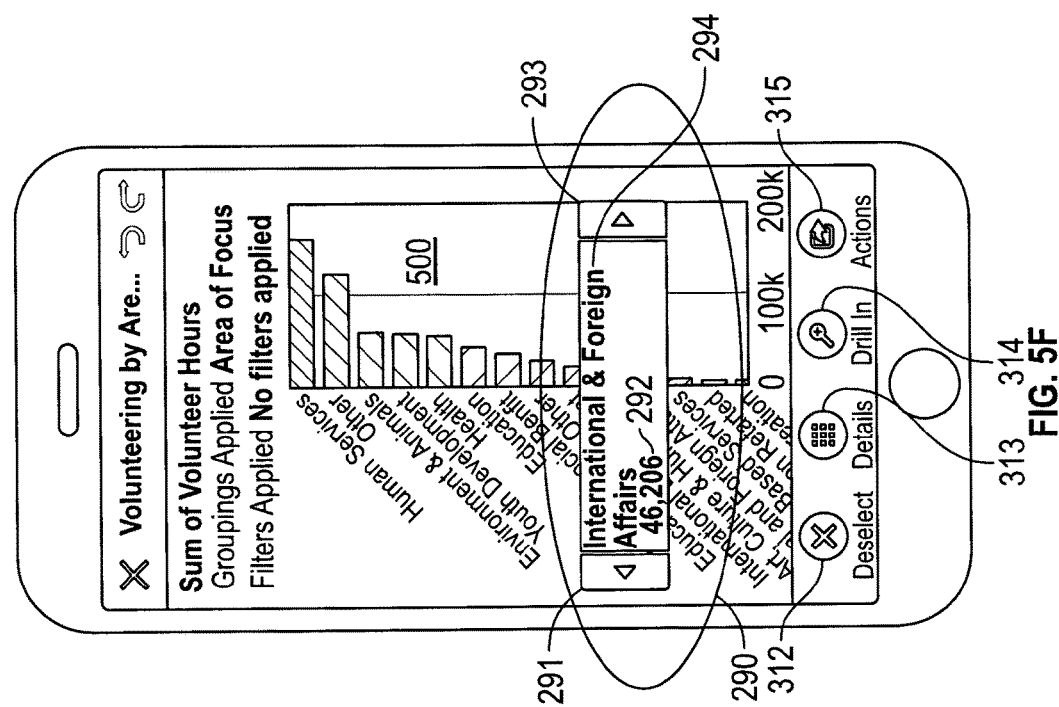
FIG. 5G
FIG. 5F

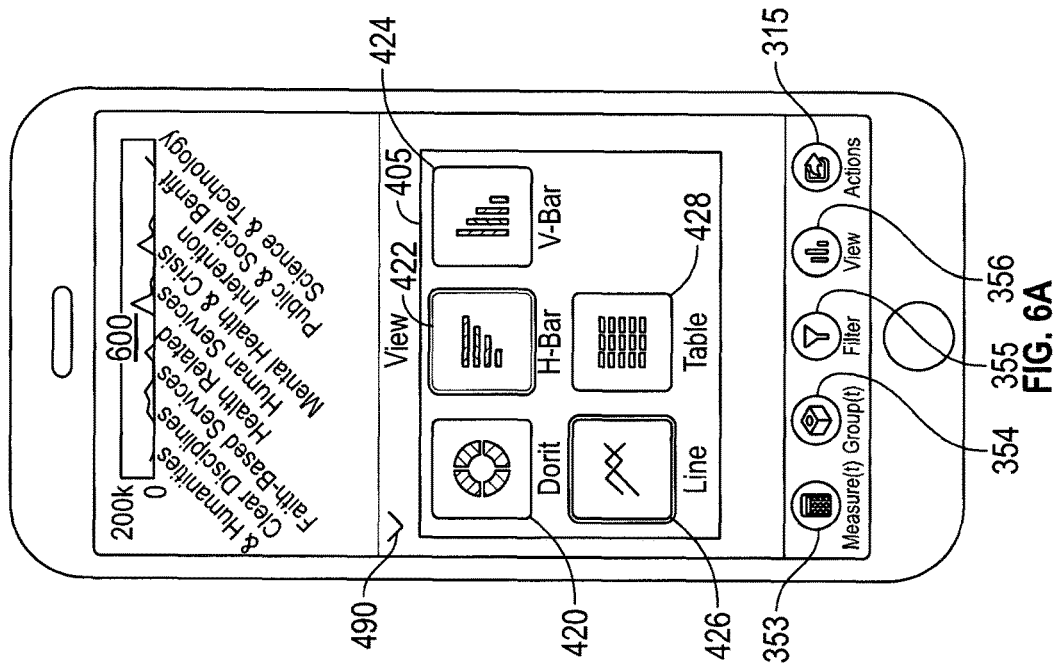
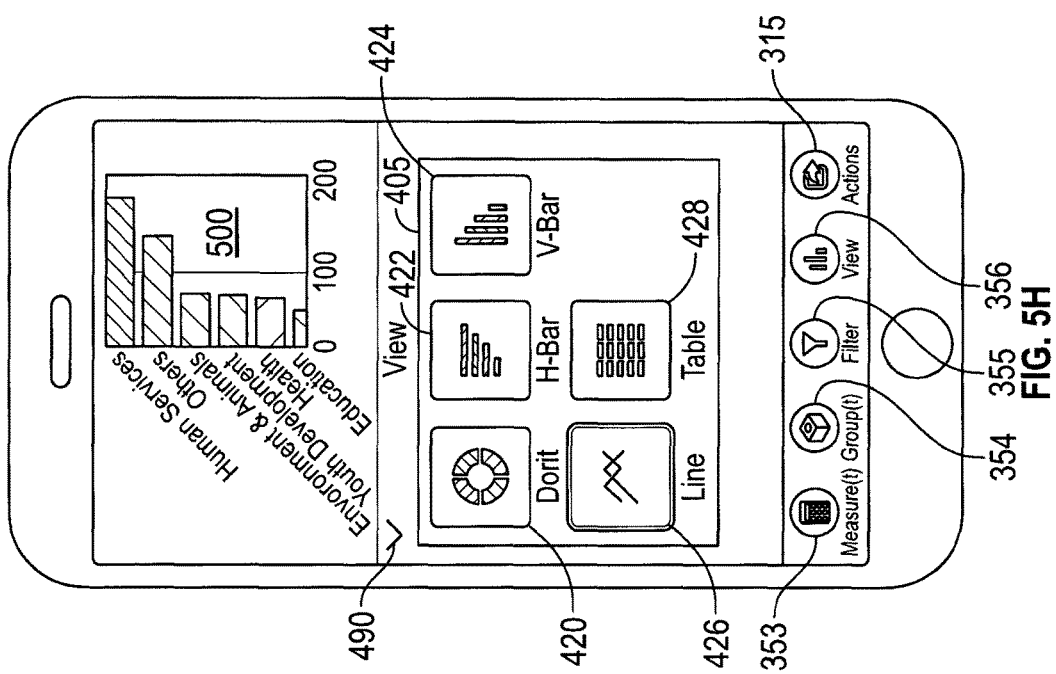

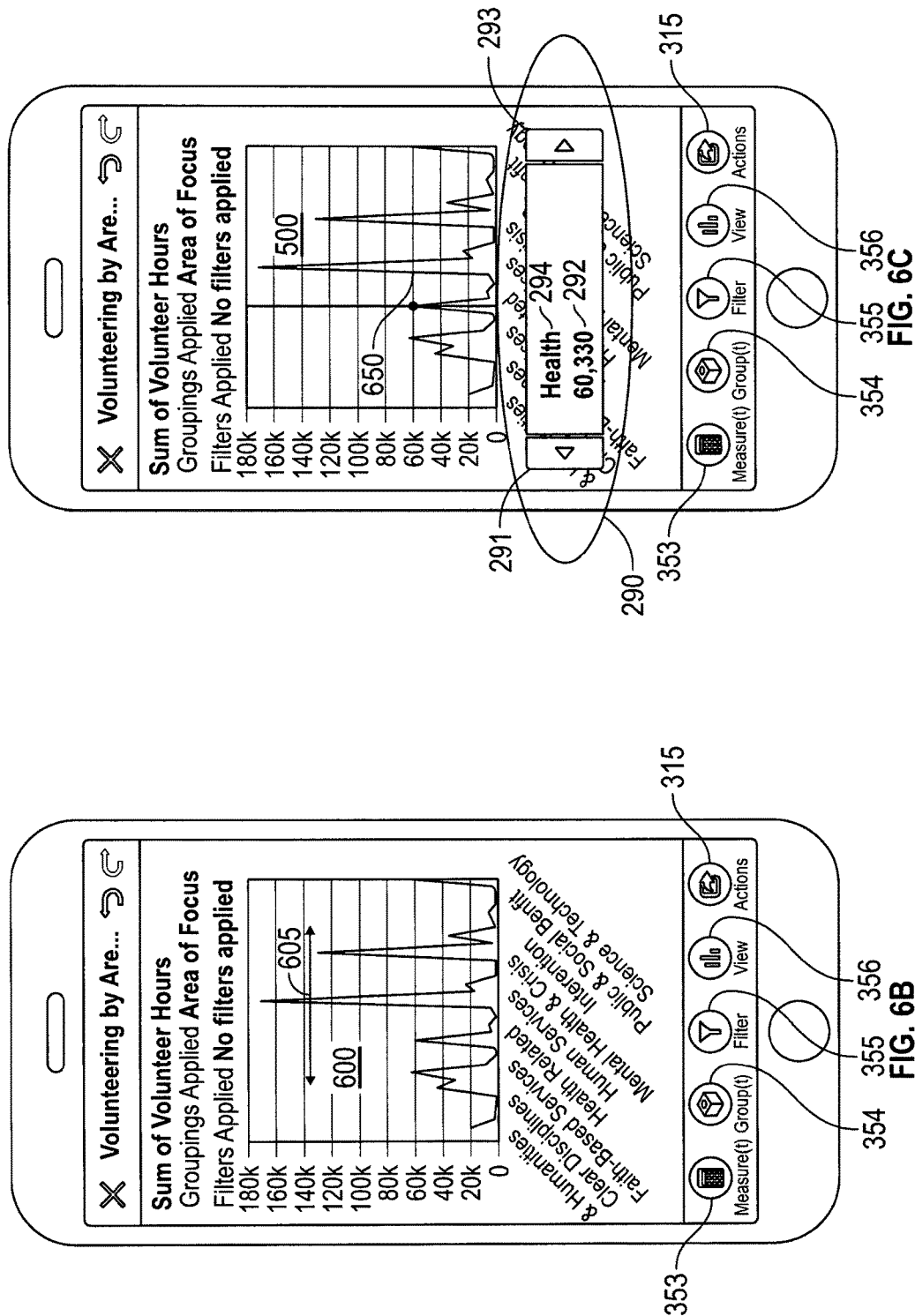

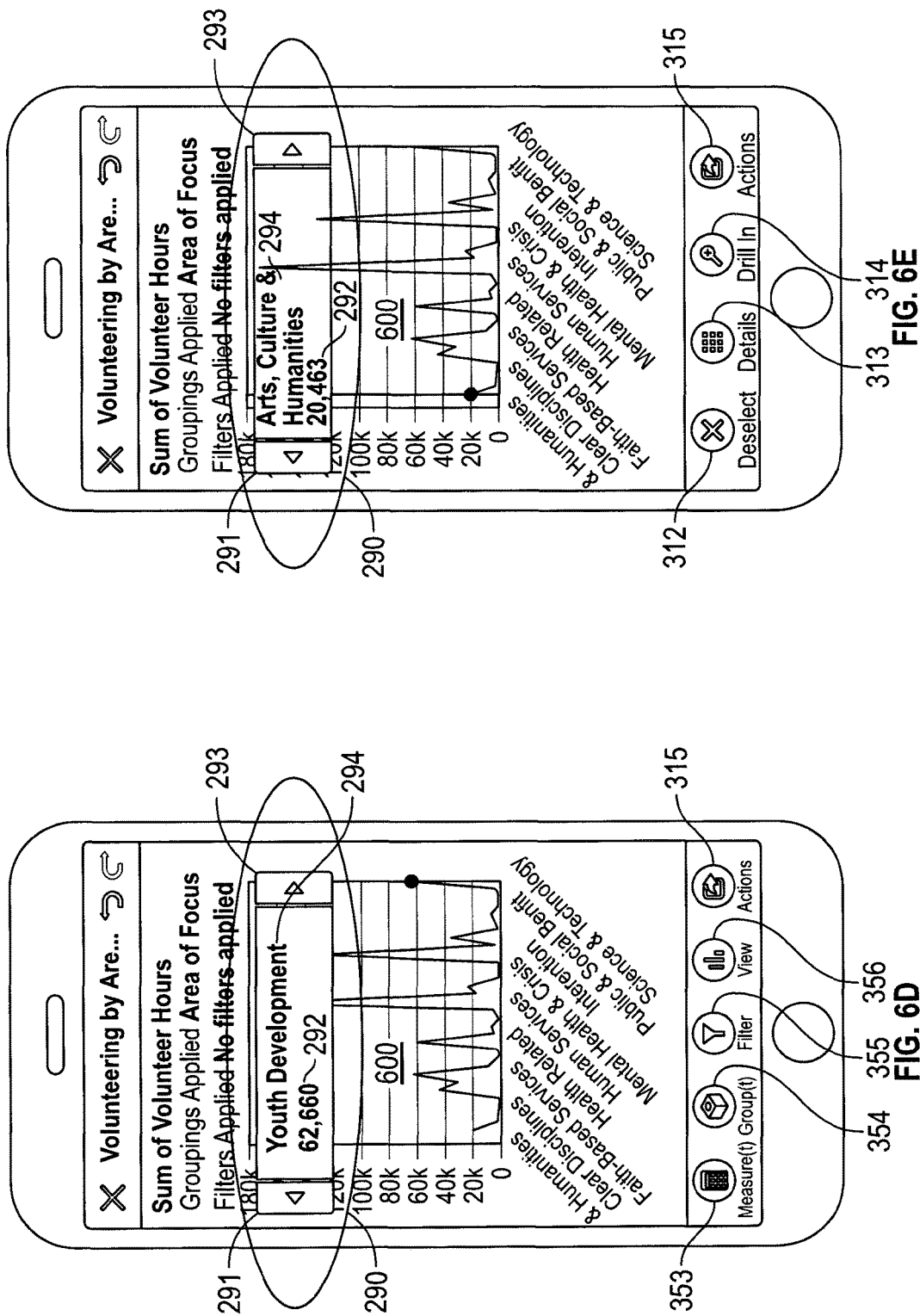

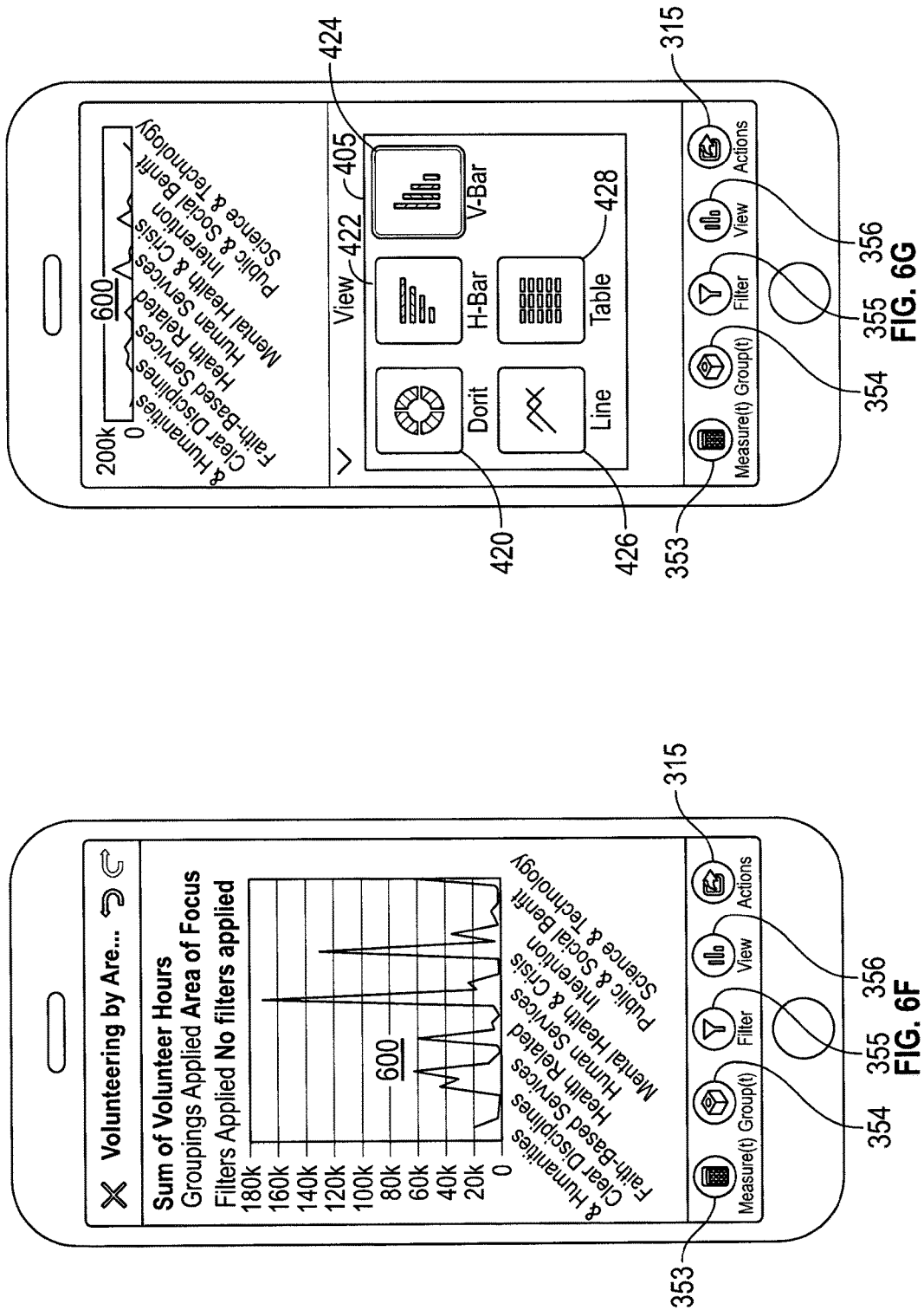

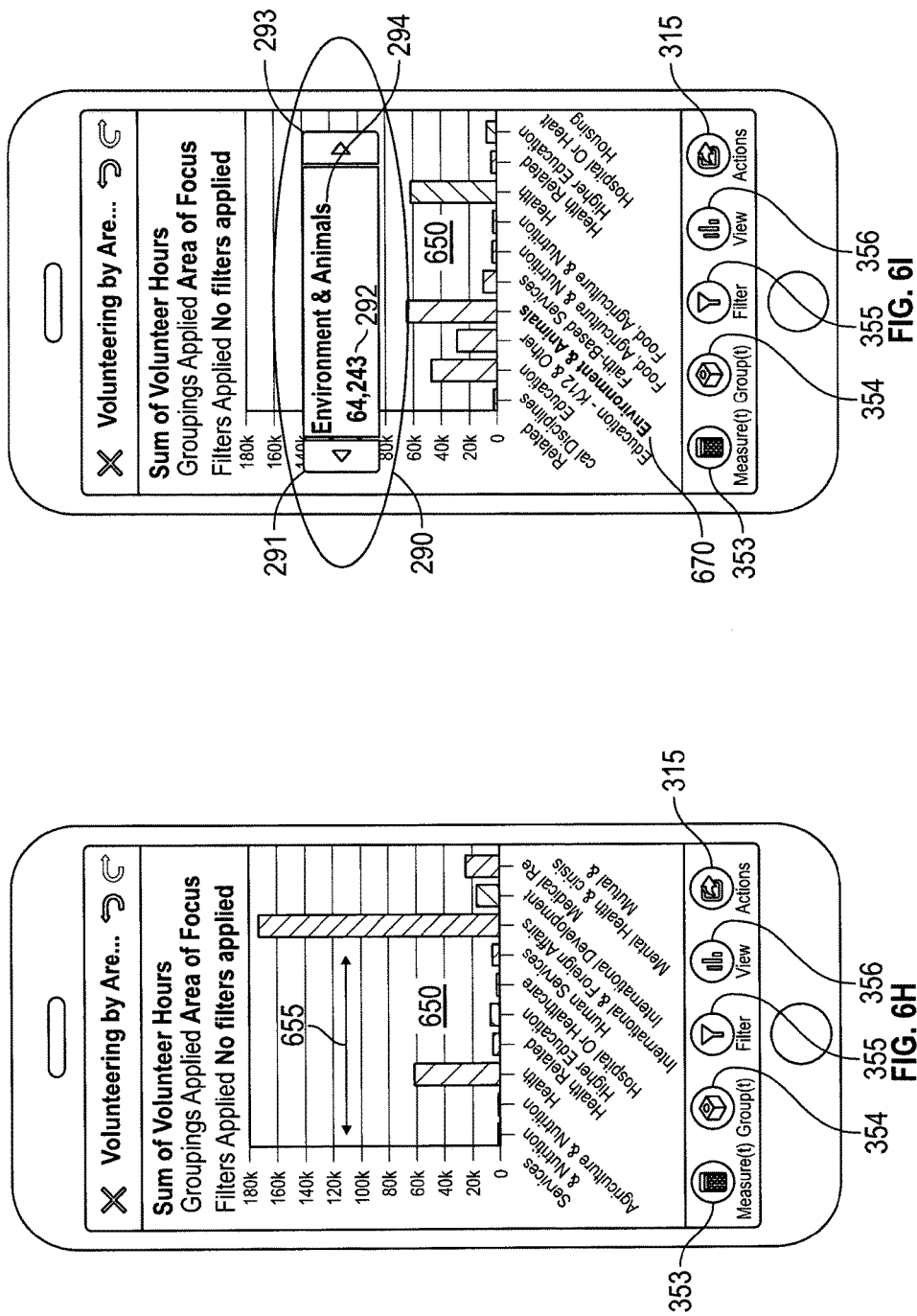

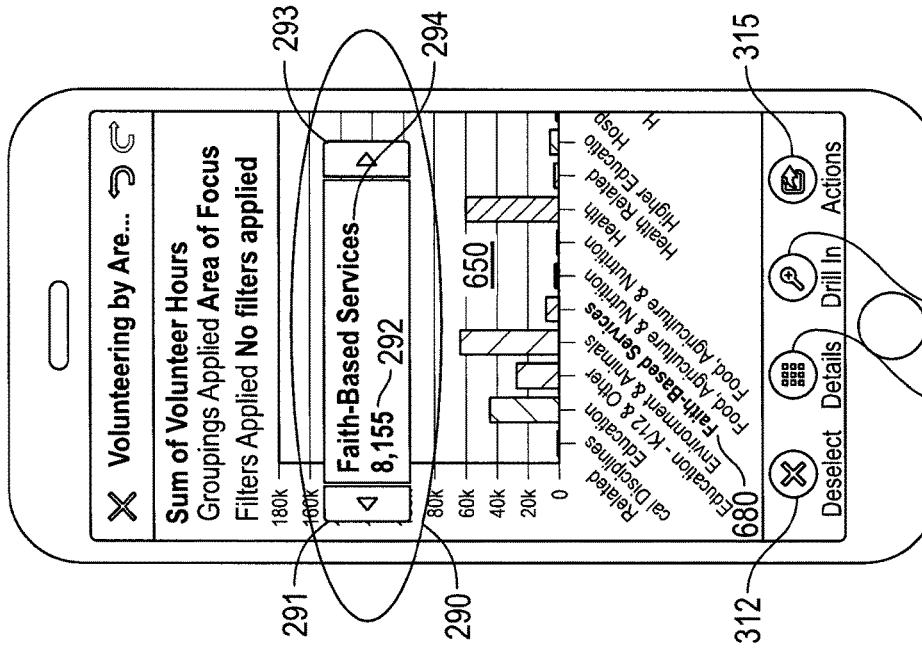
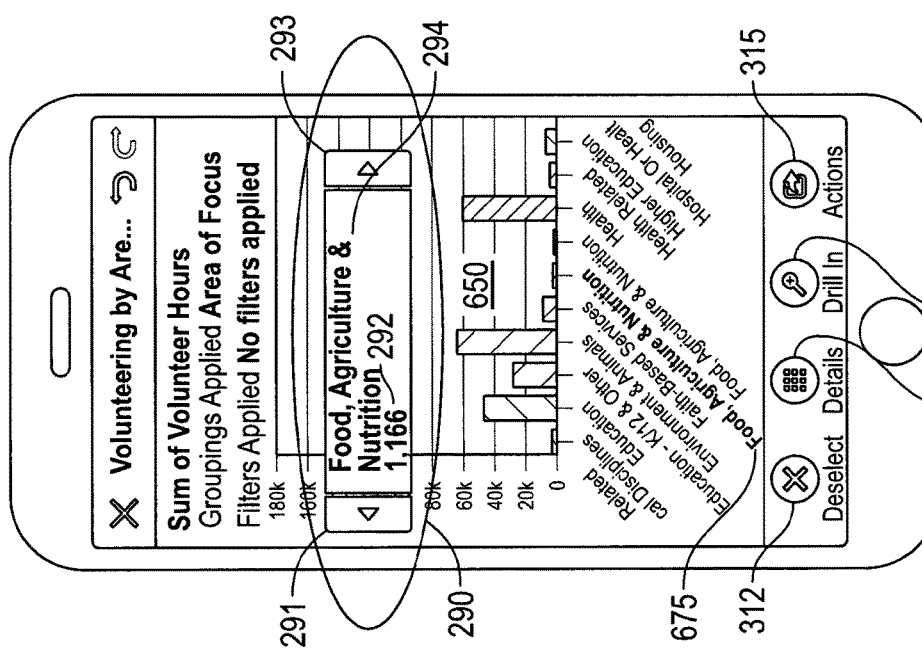

CHART SELECTION TOOLTIP

CROSS-REFERENCE TO RELATED APPLICATION

This application claims the benefit of U.S. Provisional Patent Application No. 62/062,722, filed on Oct. 10, 2014, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically relates to mobile analytics and the provision of a chart selection tooltip.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In the operation of a mobile computing system, such as, for example a smartphone, selecting and seeing one record from a chart is very difficult, particular if the value is too small to easily select.

Some conventional systems may allow for zooming in to select a portion of a chart, and then zooming out in order to view the real value and label of the chosen portion. However, this is an awkward process, particularly if a user wants to examine multiple values in a chart. Zooming in/out to select a portion of a chart is an inefficient and cumbersome process for viewing charts on a mobile computing system, and is particularly inefficient when there is a significant amount of gesture interaction occurring in the chart and touchscreen.

Thus, there is a need for a more convenient and user-friendly technology for accessing charts on a device having limited screen space, such as a smartphone or other mobile computing system.

BRIEF SUMMARY

For some embodiments, methods and apparatus for viewing chart related information using a computing system with a small display screen includes displaying information associated with a chart on a display screen of a mobile computing system using a chart type, the information including label information and value information. Based on detecting a selection of a portion of the chart, causing a tooltip to be displayed on the display screen of the mobile computing system, the tooltip displaying label information and value information associated with the selected portion of the chart. The tooltip includes a navigation tool configured to enable the tooltip to display label information and value information associated with remaining portions of the chart. The navigation tool includes a first navigation to enable displaying label information and value information associated with a previous portion of the chart relative to the selected portion of the chart and a second navigation to enable displaying label information and value information associated with a next portion of the chart relative to the selected portion of the chart.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

FIGS. 4A through 6K show images of a display screen of a mobile computing system, the images including examples of using a tooltip with charts to view chart information, in accordance with some embodiments.

DETAILED DESCRIPTION

Figure 1:
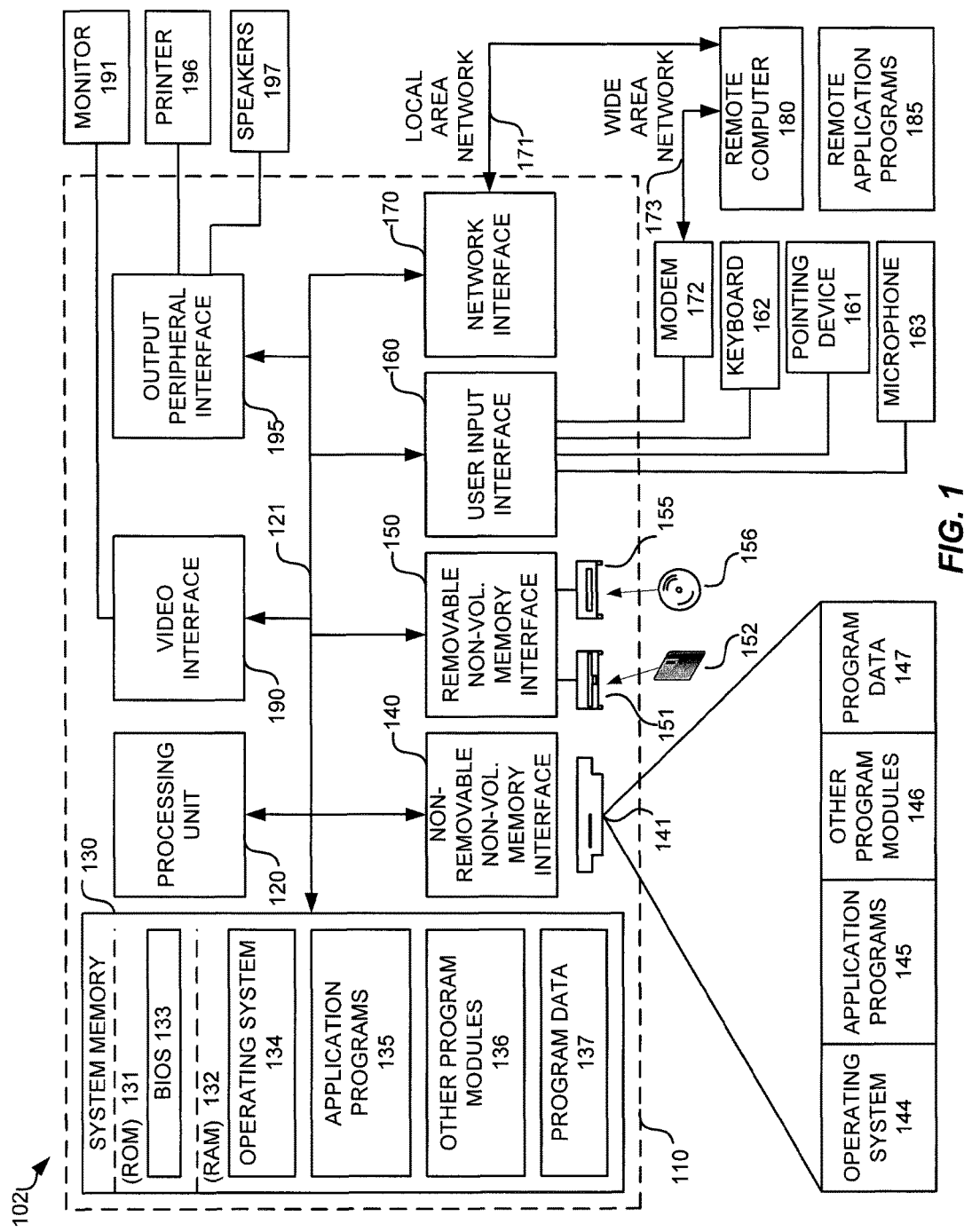
FIG. 1 shows a diagram of an example computing system 102 that may be used with some embodiments of the present invention.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

As used herein, the term "mobile computing system" refers to a smartphone, smartwatch, tablet computer, notebook or laptop computer, handheld computer, mobile Internet device, wearable technology, or other mobile electronic device that includes processing and display capability. The term "chart" refers any visual or graphical representation of data values, including, for example, pie charts, bar charts, line graphs, and other similar representations of data values.

The disclosed embodiments may include a method for displaying chart information using a display screen of a mobile computing system. The method includes displaying information associated with a chart on a display screen of a mobile computing system using a chart type, the information including label information and value information. Based on detecting a selection of a portion of the chart, causing a tooltip to be displayed on the display screen of the mobile computing system, the tooltip displaying label information and value information associated with the selected portion of the chart. The tooltip includes a navigation tool configured to enable the tooltip to display label information and value information associated with remaining portions of the chart. The navigation tool includes a first navigation to enable displaying label information and value information associated with a previous portion of the chart relative to the selected portion of the chart and a second navigation to enable displaying label information and value information associated with a next portion of the chart relative to the selected portion of the chart.

The disclosed embodiments may include an apparatus for viewing chart information using display screen of a mobile computing system and include a processor, and one or more stored sequences of instructions which, when executed by the processor, cause the processor to display information associated with a chart on a display screen of a mobile computing system using a chart type, the information including label information and value information. Based on detecting a selection of a portion of the chart, cause a tooltip to be displayed on the display screen of the mobile computing system, the tooltip displaying label information and value information associated with the selected portion of the chart.

The disclosed embodiments may include a machine-readable medium carrying one or more sequences of instructions for displaying information, which instructions, when executed by one or more processors, cause the one or more processors to display information associated with a chart on a display screen of a mobile computing system using a chart type, the information including label information and value information. Based on detecting a selection of a portion of the chart, cause a tooltip to be displayed on the display screen of the mobile computing system, the tooltip displaying label information and value information associated with the selected portion of the chart, the tooltip including a navigation tool to enable navigating and updating the tooltip with label information and value information associated with different portions of the chart.

The disclosed embodiments may be related to presenting chart information using a display screen with limited screen space such as a display screen of a mobile computing system. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some embodiments of the present invention. The computing system 102 may be used by a user to view information associated with a multi-tenant database environment. For example, the multi-tenant database environment may be associated with the services provided by Salesforce.com®. The computing system 102 may also be used to retrieve information that relate to one or more charts from the storage area.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2A:
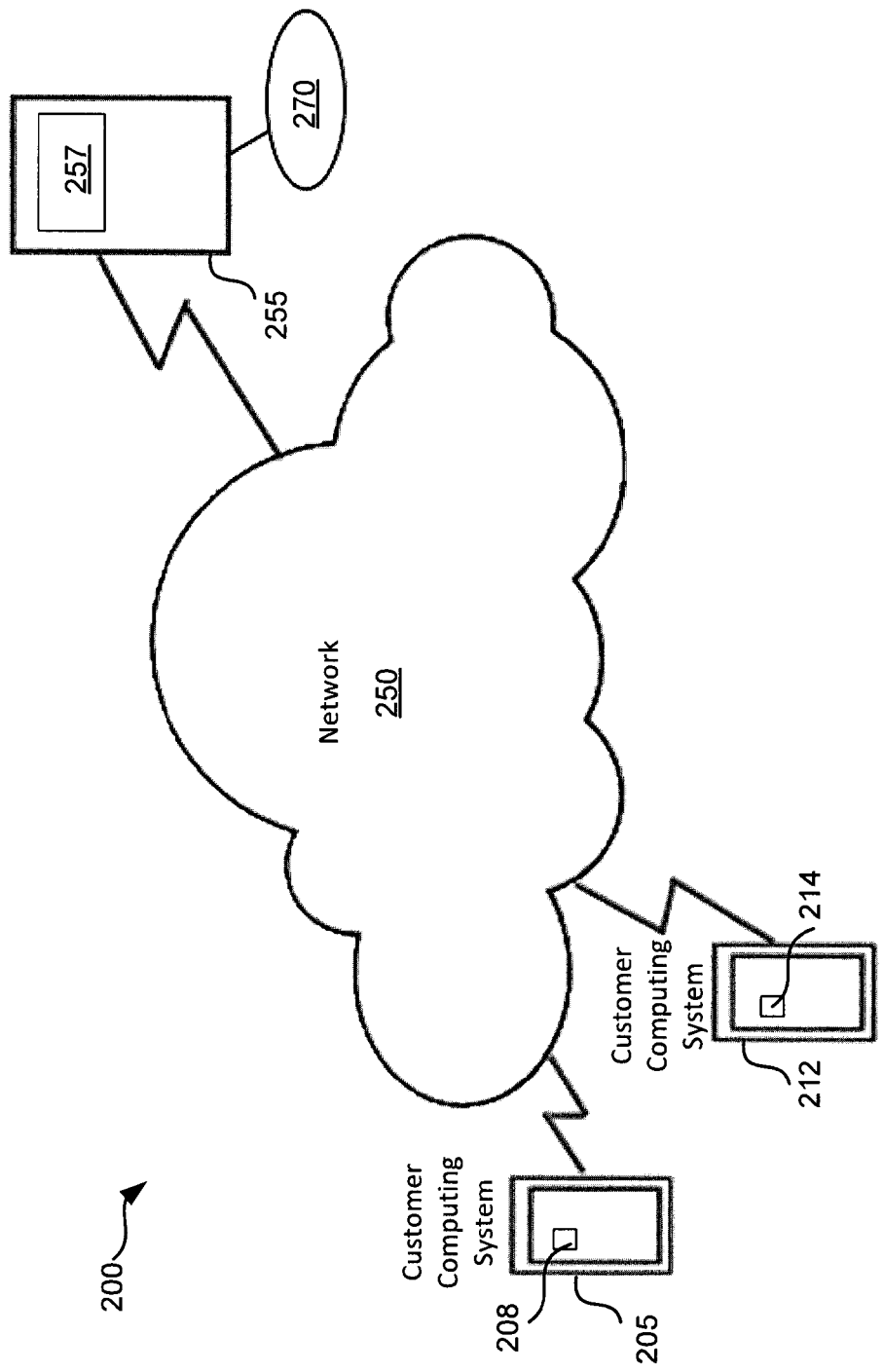
FIG. 2A shows a diagram of an example network environment that may be used with some embodiments of the present invention.

FIG. 2A shows a diagram of an example network environment that may be used with some embodiments of the present invention. Network environment 200 includes computing systems 205 and 212. One or more of the computing systems 205 and 212 may be a mobile computing system. The computing systems 205 and 212 may be connected to the network 250 via a cellular connection or via a Wi-Fi router (not shown). The network 250 may be the Internet. The computing systems 205 and 212 may be coupled with server computing system 255 via the network 250.

The computing systems 205 may include application module 208. A user may use the computing system 205 and the application module 208 to connect to and communicate with the server computing system 255 and log into application 257 (e.g., a Salesforce.com® application). The server computing system 255 may be coupled with database 270. The server computing system 255 may be associated with an entity (e.g., Salesforce.com®). The user may be associated with a customer of the entity. The user may request for information from the application server 255 and may view the information on a display screen associated with the computing system 205. The information may be displayed together with one or more charts.

Figure 2B:
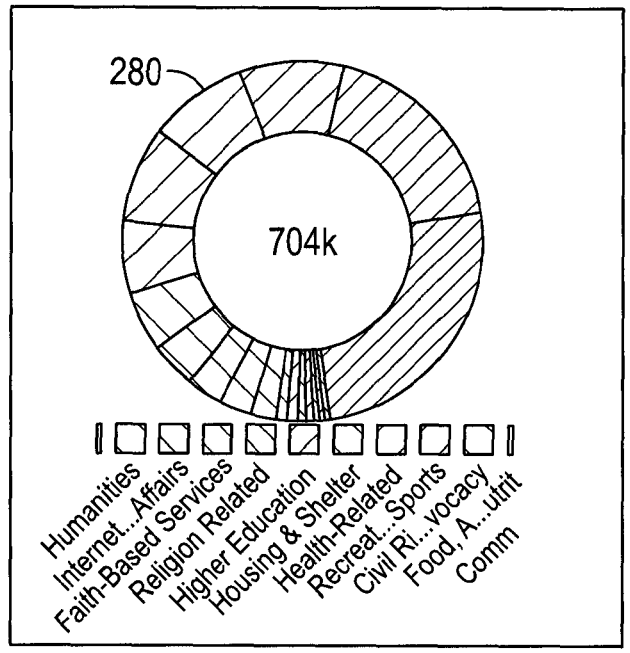
FIGS. 2B, 2C and 2D illustrate different charts that may be displayed on a display screen of a computing system, in accordance with some embodiments.
Figure 2C:
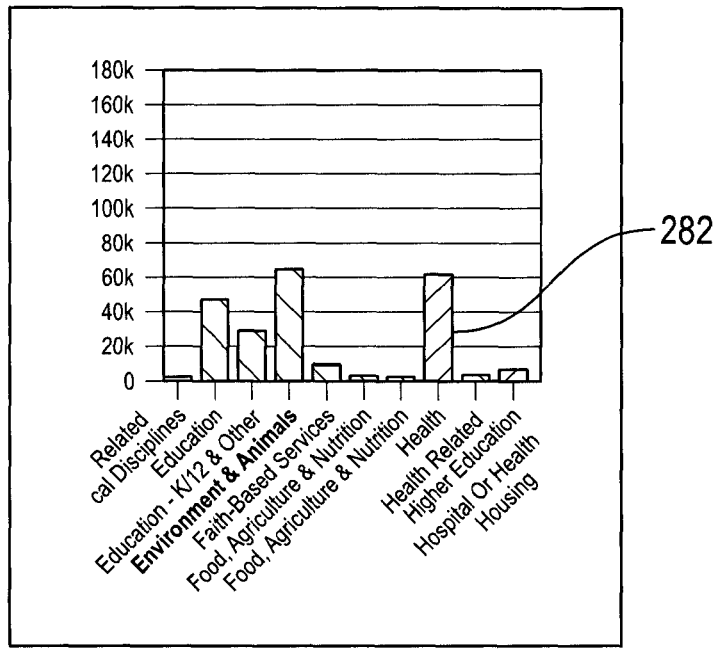
Figure 2D:
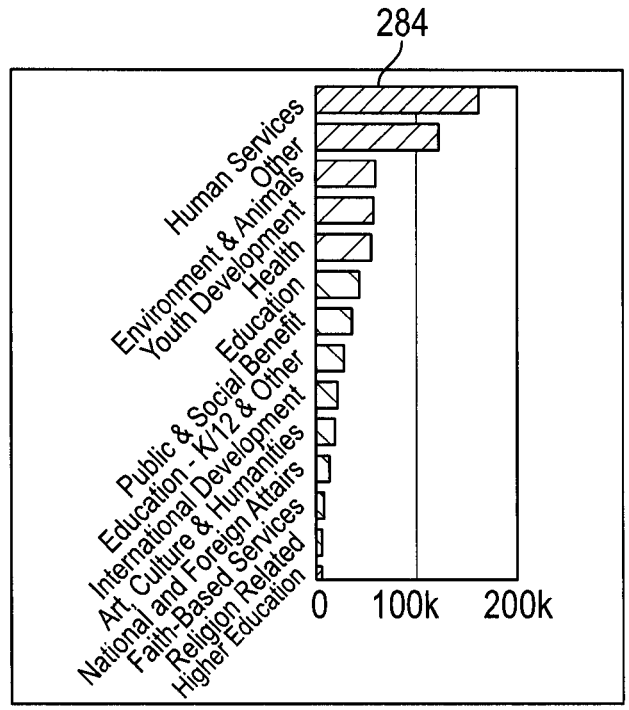

FIGS. 2B, 2C and 2D illustrate different charts that may be displayed on a display screen of a computing system, in accordance with some embodiments. A computing system may be a mobile computing system and may have a small display screen. When a chart is displayed on a small display screen, the information on the chart may not be as readable as when the chart is displayed on a larger screen. As examples of displaying charts using a small display screen, a doughnut chart 280 is shown in FIG. 2B, a vertical bar chart 282 is shown in FIG. 2C, and a horizontal bar chart 284 is shown in FIG. 2D. As shown in the examples, the information associated with various portions of the charts 280, 282 and 284 is difficult to read. The small screen size also makes it difficult to select or interact with any portions of the charts 280, 282 and 284.

Figure 2E:
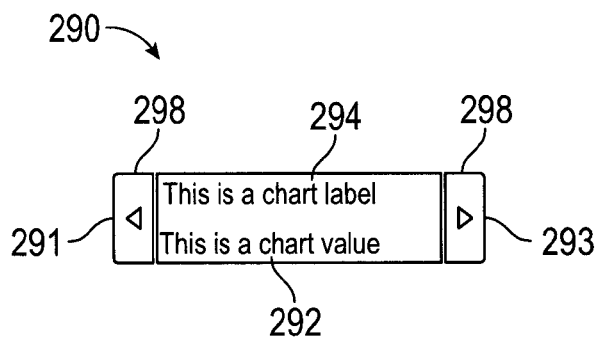
FIG. 2E illustrates an example tooltip to enable better viewing of chart information, in accordance with some embodiments.

FIG. 2E illustrates an example tooltip to enable better viewing of chart information, in accordance with some embodiments. Tooltip 290 (which may also be referred to as an image, icon, or other term) may be used to enable better viewing of information associated with selected portions of a chart such as the chart 280, 282 or 284. For some embodiments, the tooltip 290 is enabled when a portion of the chart is selected, such as a selection by a detected touch on a touchscreen. When enabled, the tooltip 290 may display label information 294 associated with the selected portion of a chart and value information 292 associated with the selected portion of the chart. For some embodiments, the label information 294 and/or the value information 292 may be scrolled in circumstances in which the label information 294 and/or value information 292 is too long to fit due to the size of the tooltip 290.

For some embodiments, the tooltip 290 includes a navigation tool 298. The navigation tool 298 may include options to navigate in different directions to enable viewing information associated with different portions of the chart. For example, the navigation tool 298 may include one or more navigation buttons, which may include a first navigation 291 (e.g., a first button) to enable viewing information associated with a first portion of the chart in a first direction (e.g., a "previous" portion) and a second navigation 293 (e.g., a second button) to enable viewing information associated with a second portion of the chart in a second direction (e.g., a "next" portion). For some embodiments, the navigation tool 298 may include one or more of a left navigation, right navigation, up navigation and down navigation. The navigation is based on a currently selected portion of the chart. It should be noted that, although the tooltip 290 is shown in FIG. 2E as a horizontal bar, the tooltip 290 can be implemented in any form as long as the tooltip 290 can be used to enable displaying at least the label information 294, the value information 292, and the navigation tool.

For some embodiments, the tooltip 290 is a part of the graphical user interface (GUI) for accessing information on a computing system. For some embodiments, the tooltip 290 may be displayed on a screen, such as a touch screen of a computing system. For some embodiments, the tooltip 290 may also or alternatively be displayed on an external screen, such as television or external screen that is displaying data from a mobile computing system.

For some embodiments, the tooltip 290 is moveable to different positions on a display screen (e.g., a display screen of a mobile computing system). For example, a user may drag the tooltip 290 from a current position to a different position if tooltip 290 is covering any portion of the chart that the user wishes to view. For some embodiments, the tooltip 290 is highly flexible and is configured to allow a user to easily select a tiny portion of a chart without zooming in to or zooming out of the chart to view the label information and the value information for such portion of the chart.

Figure 2F:
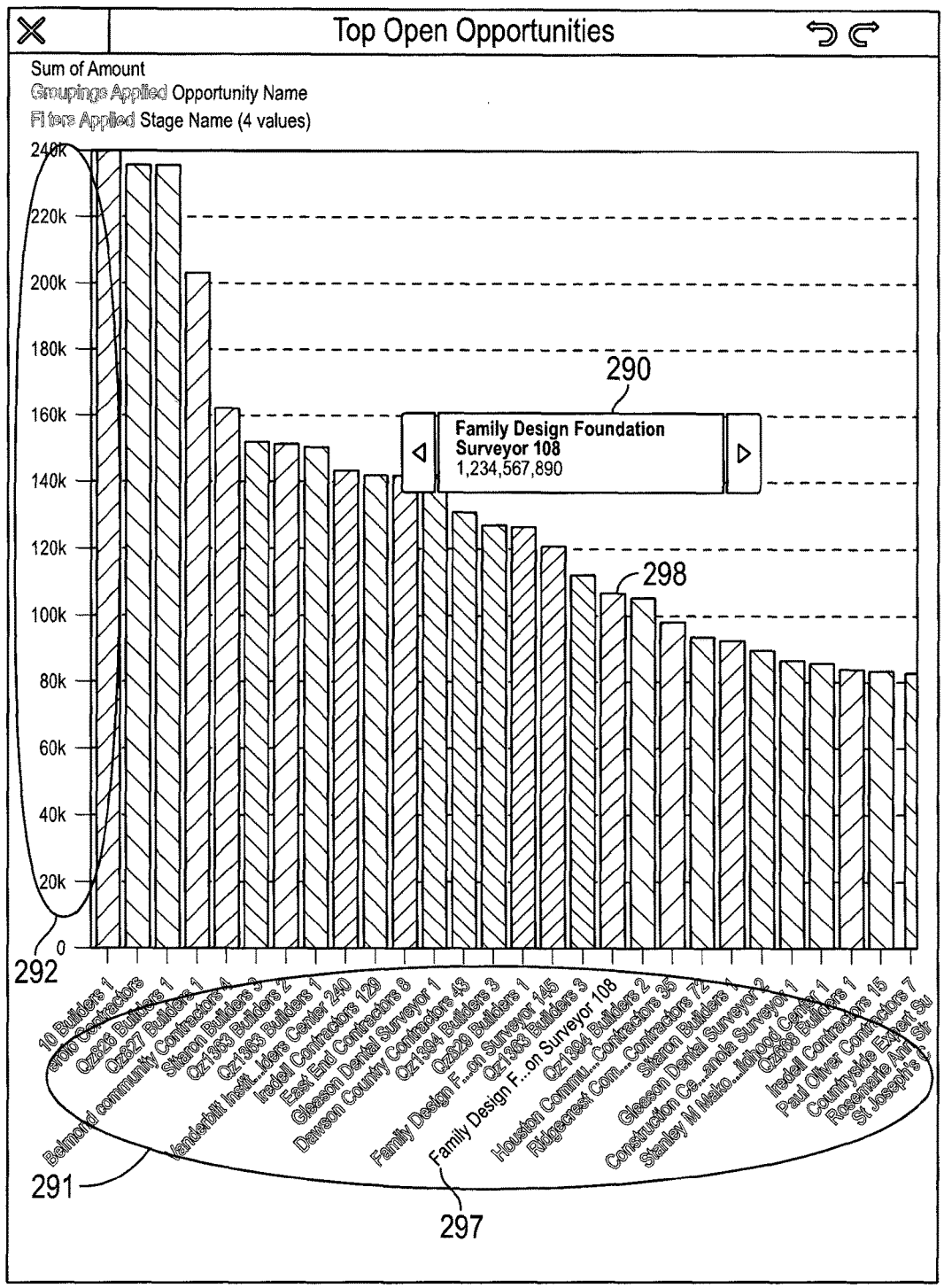
FIG. 2F shows an example vertical bar chart displayed on a display screen, in accordance with some embodiments.

FIG. 2F shows an example vertical bar chart displayed on a display screen, in accordance with some embodiments. The display screen in this example may be larger than a display screen of a mobile computing system and is used in this example to show the relationship between the tooltip 290 and the vertical bar chart 296. As shown FIG. 2F, the vertical bar chart 296 is displayed with the tooltip 290. The tooltip 290 may be enabled by touching a portion of the vertical bar chart 296 to select a desired portion. Other methods of selecting the portion of the bar chart 296 may also be implemented. For some embodiments, the selected portion may be displayed in a manner to identify the portion, such as causes all non-selected portions to be displayed in gray and the selected portion to be displayed in a color, which may be the color of the selected portion prior to the enablement of the tooltip 290.

The vertical bar chart 296 includes label information section 291 and value information section 292. The tooltip 290 is set to display the label information and the value information associated with a particular selected portion of the vertical bar chart 296. In this example, the selected portion of the vertical bar chart 296 is the vertical bar 298, and the label information 297 associated with the vertical bar 298 may be highlighted (e.g., displayed in bold). When the vertical bar 298 is selected, the tooltip 290 may display the label information 297 and may further display the corresponding value information.

Figure 3A:
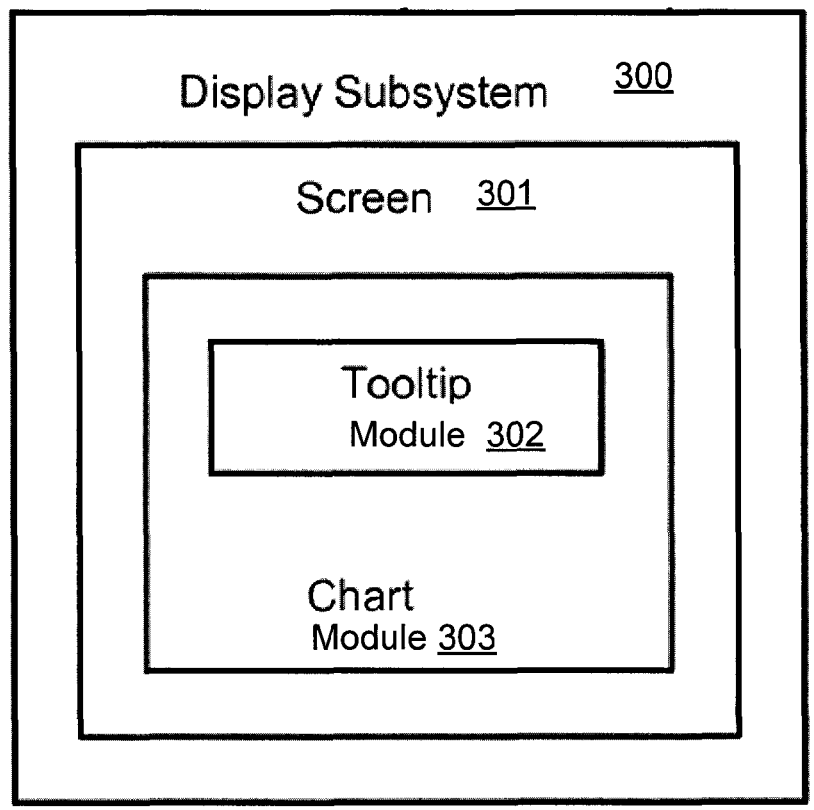
FIG. 3A shows an example display subsystem, in accordance with some embodiments.

FIG. 3A shows an example display subsystem, in accordance with some embodiments. Display subsystem 300 may be associated with a computing system that is used to display a tooltip such as the tooltip 290 shown in FIG. 2E. The display subsystem 300 represents hardware (such as display devices) and software (such as drivers) components that provide a display having visual, tactile, or both elements for a user to interact with the computing system. The display subsystem 300 may include a display screen 301 operable to display charts.

The computing system includes a chart module 303 configured to display charts and chart-related options including, for example, options to display various types of charts based on the same label information and value information. The computing system includes a tooltip module 302 to display a tooltip such as the tooltip 290 to enable viewing information associated with portions of the chart 303 and to allow navigation between different portions of the chart 303. The display screen 301 may include an external screen, such as an external screen to which images from the computing device are directed. This may be, for example, a mobile device providing images for display on a television or other external screen using a wireless or cable connection. For some embodiments, the tooltip 290 may be displayed on the external screen such as a television screen but it may not be possible to directly interact with the tooltip 290 on the external screen because the television lacks the capability for such interaction.

Figure 3B:
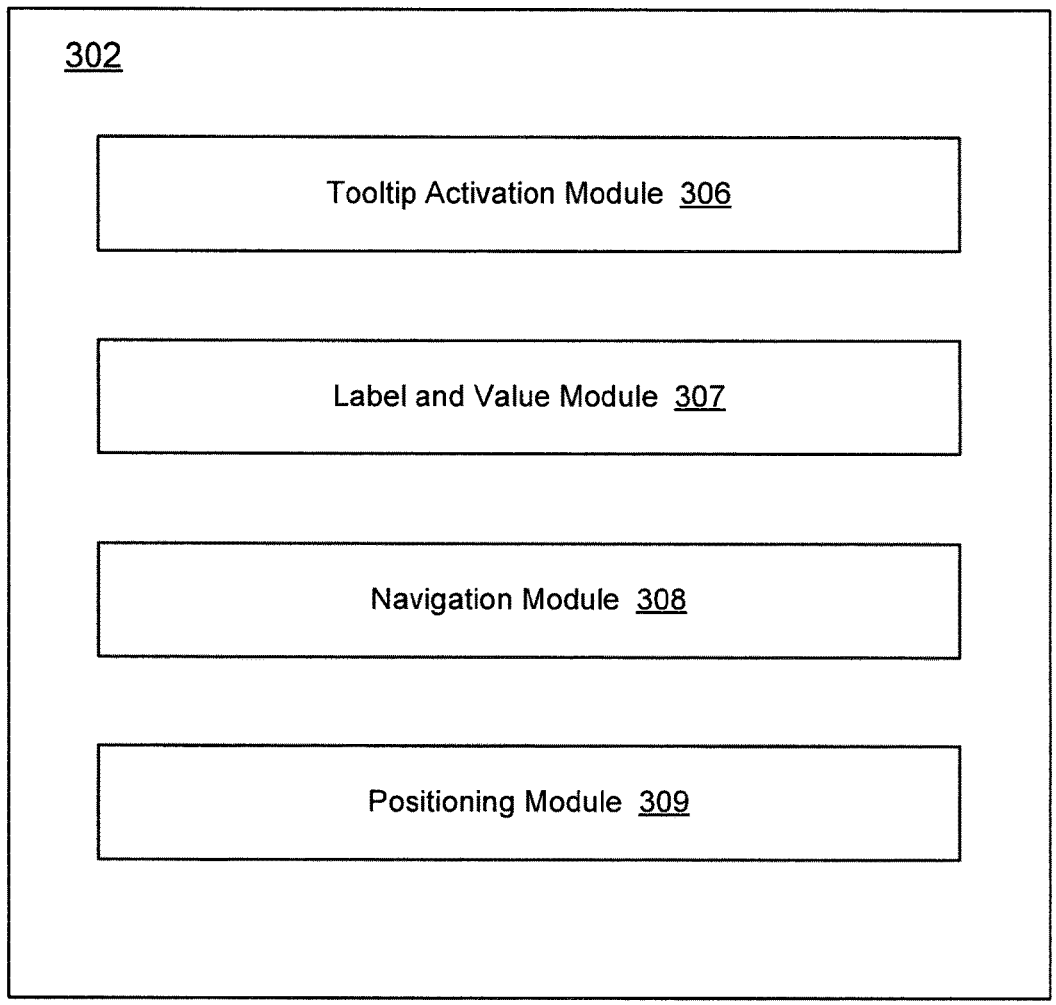
FIG. 3B shows an example tool tip module, in accordance with some embodiments.

FIG. 3B shows an example tool tip module, in accordance with some embodiments. The tool tip module 302 may include a tooltip activation module 306, a label and value module 307, a navigation module 308, and a positioning module 309. The tooltip activation module 306 may be configured to detect an action to display the tooltip 290. For example, when the tooltip activation module 306 detects a user touching or selecting a portion of a chart, the tooltip activation module 306 displays the tooltip 290 with information associated with the selected portion of the chart.

The label and value module 306 may be configured to identify the selected portion of the chart and displays label information and the value information associated with the selected portion of the chart. The navigation module 307 may be configured to detect navigation action and update the label information and the value information to reflect the portion of the chart that is navigated to. For some embodiments, when the navigation action is detected, the label information and the value information may be updated but the position of the tooltip 290 may remain the same. For some other embodiments, the position of the tooltip 290 may be updated to be closer to the portion of the chart that is navigated to.

The positioning module 309 may be configured to detect dragging action and update the position of the tooltip 290. For example, a user may touch the tooltip 290 at a location where the tooltip 290 is currently displayed on the display screen 301 and drag the tooltip 290 to a different location on the display screen 301. The positioning module 309 is configured to display the tooltip 290 at the new location. It may be noted that the tooltip 290 may display the same label information and value information when the tooltip 290 is moved from one location to another location. The positioning module 309 may enable a user to prevent the tooltip 290 from overlapping certain portions of the chart 303 that the user wants to view.

Figure 3C:
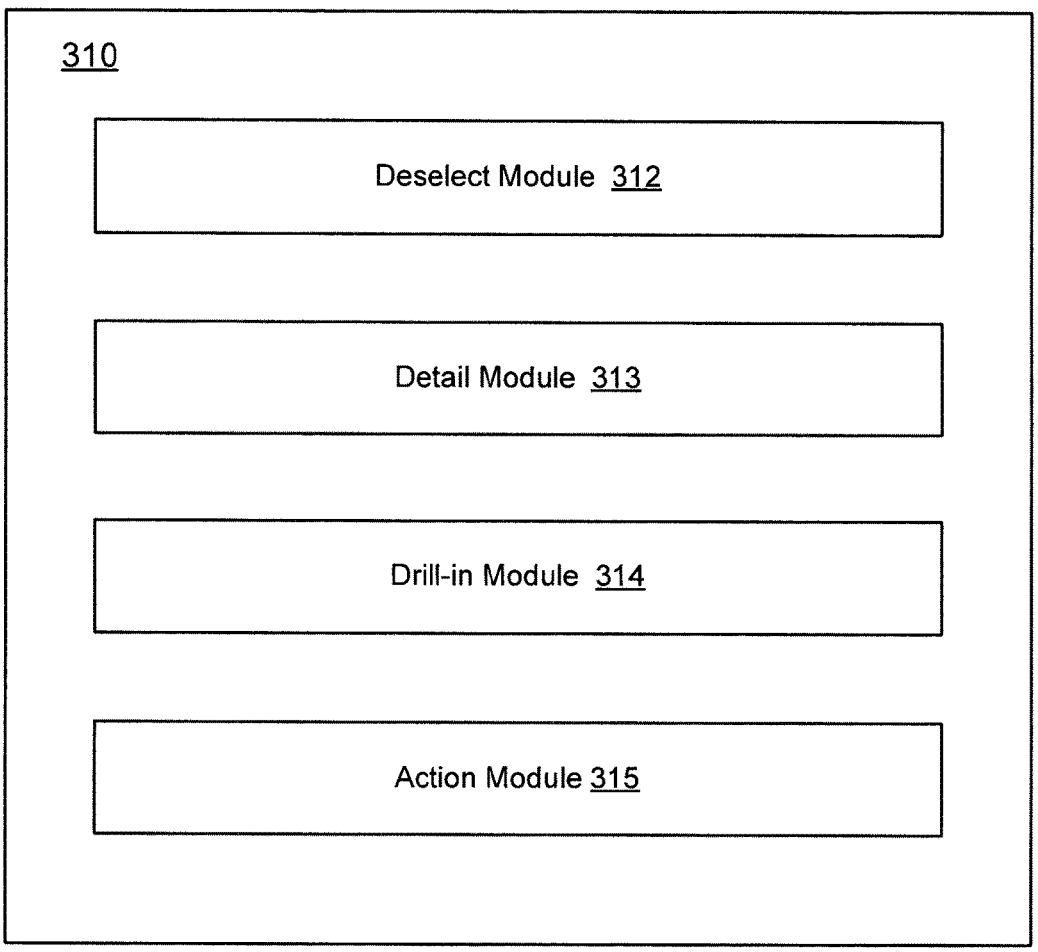
FIGS. 3C and 3D show example modules that may be included in the chart module, in accordance with some embodiments.
Figure 3D:
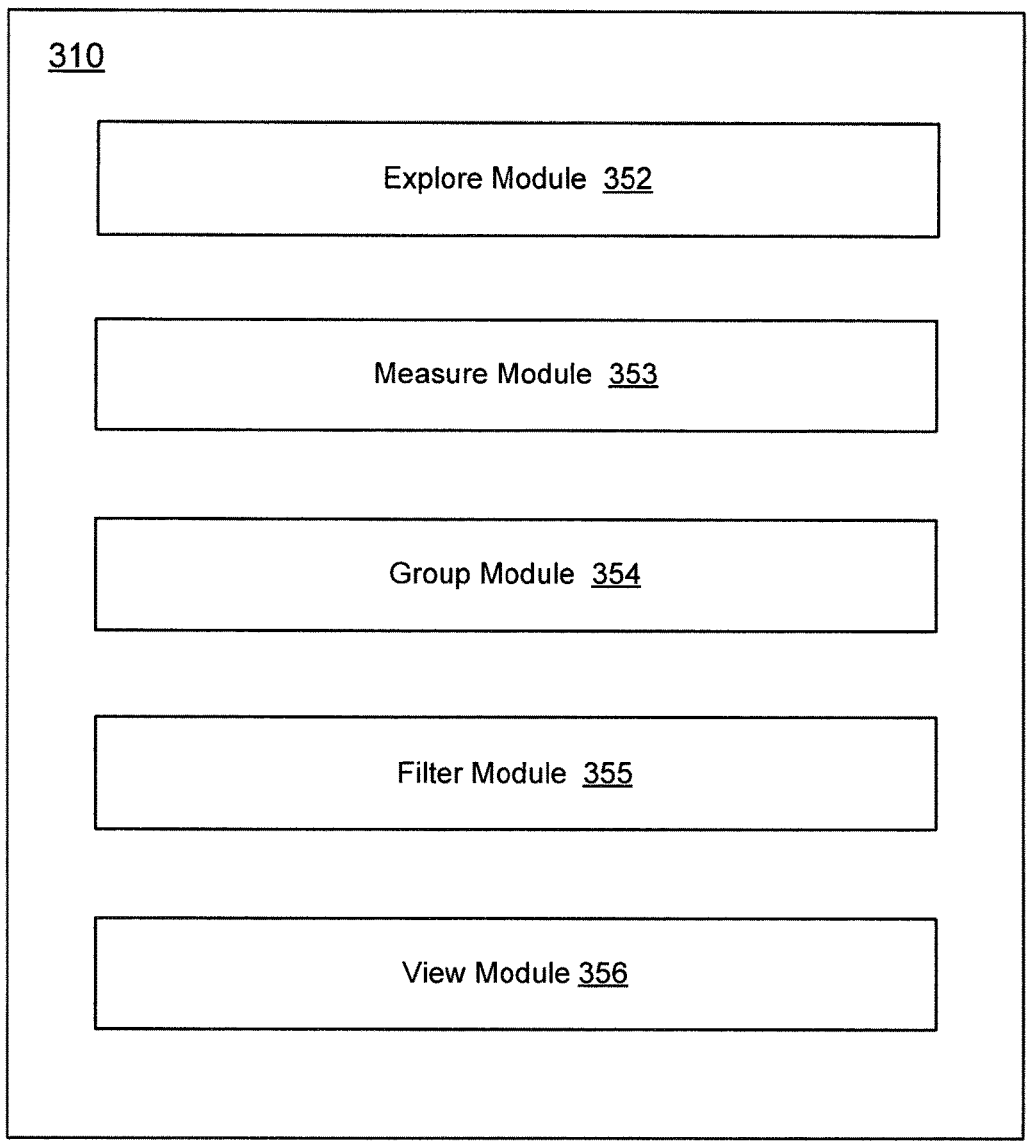

FIGS. 3C and 3D show example modules that may be included in the chart module, in accordance with some embodiments. As shown in FIG. 3C, the chart module 303 may include a deselect module 312, a detail module 313, a drill-in module 314, and an action module 315. The deselect module 312 may be configured to enable removing the display of the tooltip 290 from the display screen. The detail module 313 may be configured to enable showing the records composing the selection. For example, when activated, the detail module 313 may cause a table view to be visible with the details of each record that the selection is composed of. The drill-in module 314 may be configured to enable the user to group the selection by another dimension. When the drill-in module 314 is activated, the user may need to choose another dimension to group the selection only. This allows the user to get more detailed information about the selection. The action module 315 may be configured to enable the user to perform various actions to the lens or dashboard that the user has created. For example, when the action module 315 is activated, the user may be able to perform save function, share function, or edit function. The saving function enables saving the lens or dashboard that the user has created. The sharing function enables the user to share via in diverse methods such as email, text message, or any social channels such as Facebook, Twitter, etc. The edit function enables the user to edit the layout of the dashboard or lens that the user has created.

Figure 4B:
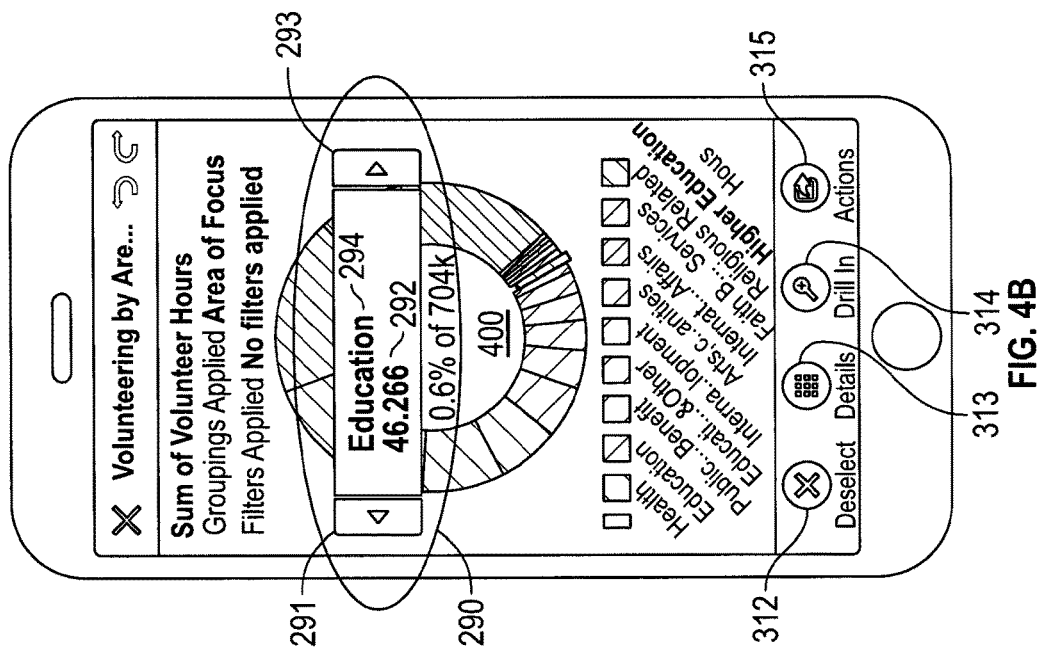

As shown in FIG. 3D, the chart module 303 may also include an explore module 352, a measure module 353, a group module 354, a filter module 355 and a view module 356. The explore module 352 may be configured to enable toggling from a viewing a current set of modules (e.g., "explore" and "action") such as shown at the bottom of FIG. 4E to viewing a different set of modules (e.g., "measure", "group", "filter" and "view") such as shown at the bottom of FIG. 4F. The measure module 353 may be configured to enable the user to select which measure to display (e.g., numeric values like sum of amount). The group module 354 may be configured to enable the user to choose how to group the measure. For example, the user may group by one or multiple dimensions such as, for example, "account name" or "region". The filter module 355 may be configured to enable the user to filter the information to be displayed. For example, the user may restrict the "account name" category to certain names, or the user may group dates by certain date range. The view module 356 may be configured to enable the user to switch between different chart types (e.g., bar chart, line chart, donut chart and table).

Figure 4A:
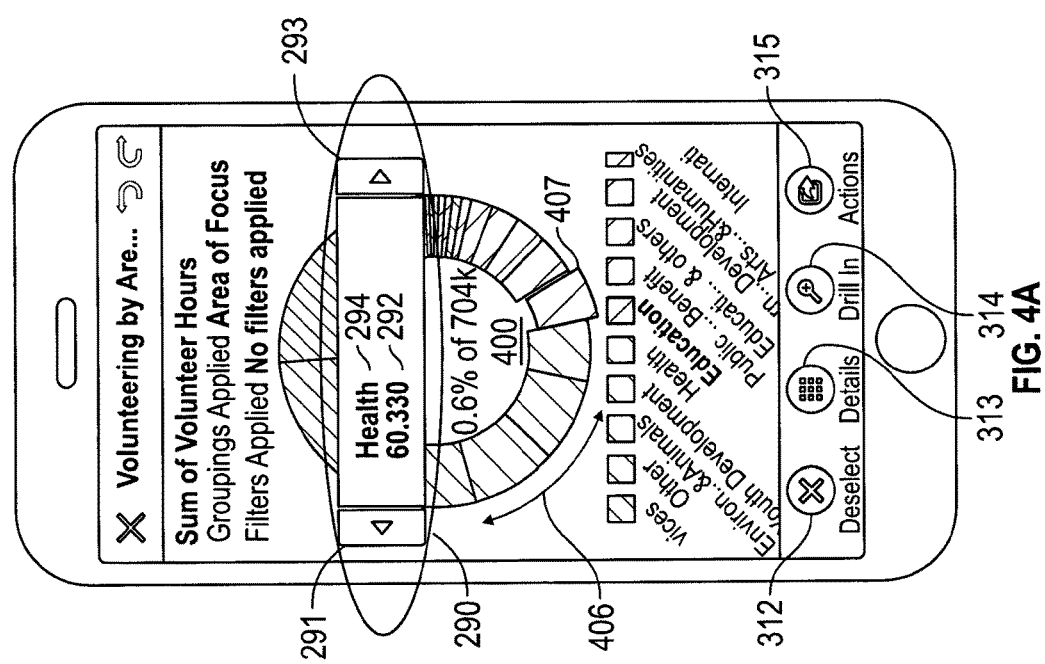
Figure 4F:
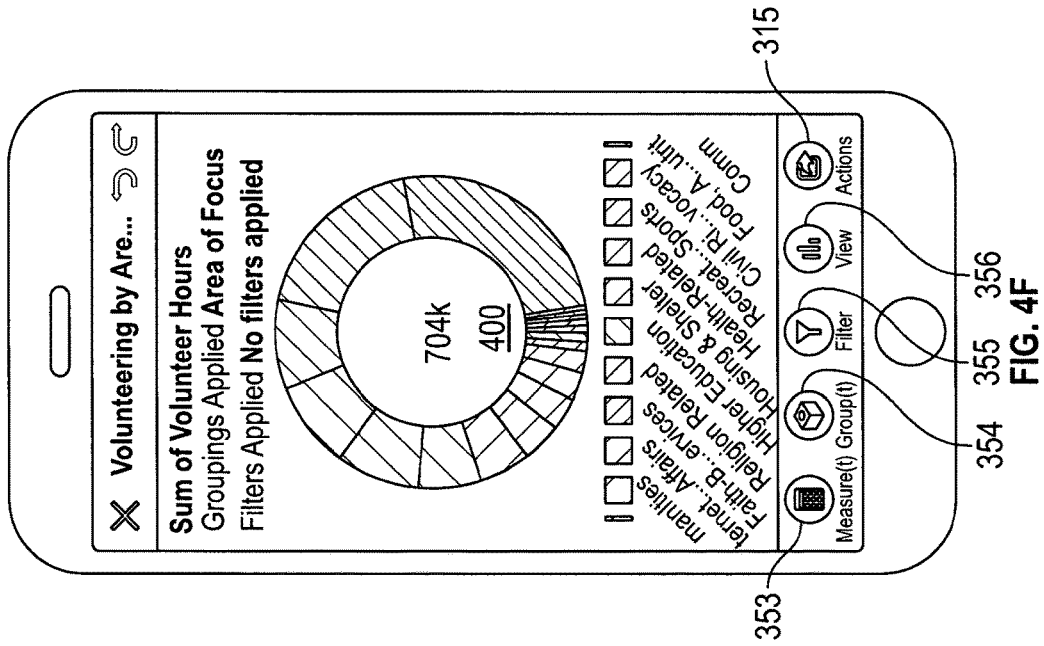
Figure 4E:
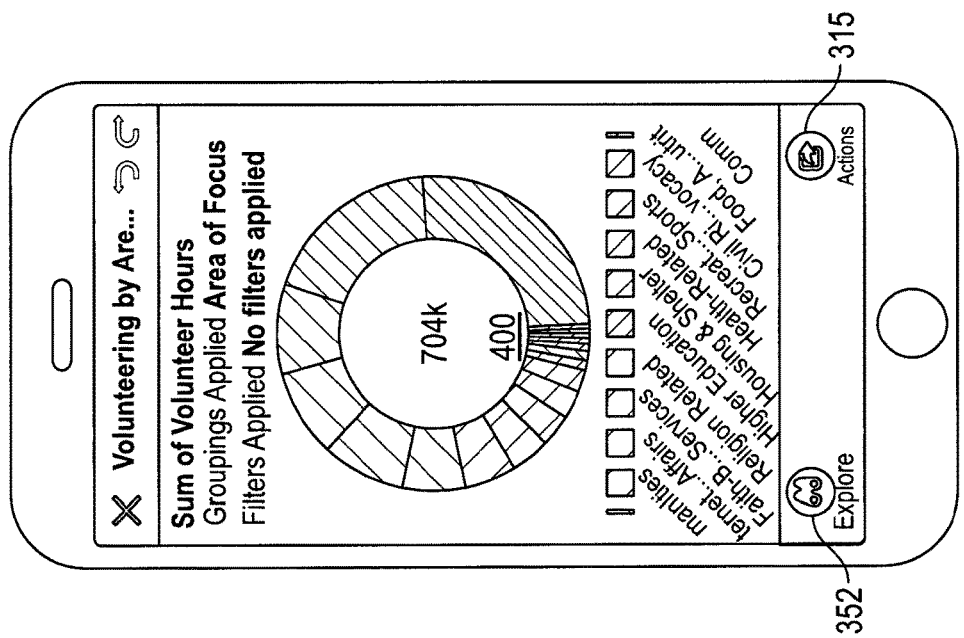

FIGS. 4A through 6K show images of a display screen of a mobile computing system, the images including examples of using a tooltip with charts to view chart information, in accordance with some embodiments. The display screen described with these examples is a touch sensitive screen. As shown in FIG. 4A, an image of a donut chart 400 (similar to a pie chart without a center portion) includes multiple values of slices of the chart. Displayed toward the bottom of the display screen are the images or icons associated with the deselect module 312, details module 313, drill-in module 314, and actions module 315. A user may rotate the donut chart 400 by touching a portion of the donut chart 400 and swipe generally in a direction shown by the bi-directional arrow 406. The user may select a portion of the donut chart 400 by touching that portion on the display screen. For example, when the user touches the portion 407 of the donut chart 400, the portion 407 is highlighted (or offset).

When the user selects a portion of the donut chart 400, the tooltip 290 is displayed on the display screen along with the appropriate label and value information. In the current example, the tooltip 290 is displayed with its navigation tool, including first navigation 291 and second navigation 293. A user can touch the second navigation 293 to view the information to the right of the currently selected portion of the donut chart 400. Similarly, the user can touch the first navigation 291 to view the information to the left of the currently selected portion of the donut chart 400. For example, when the currently selected portion is associated with "Health", the portion to the right is "Education", and the portion to the left is "Youth Development."

As shown in FIG. 4A, if the user selects the second navigation 293, the tooltip 290 is updated, as shown in FIG. 4B. FIG. 4B illustrates that if the user continues to select the second navigation 293, the tooltip 290 is continuously updated to reflect the currently selected portion of the donut chart 400. FIG. 4C shows an image of the display screen when the currently selected portion is associated with "Higher Education". FIG. 4D shows an image of the display screen when the currently selected portion is associated with "Housing & Shelter". For some embodiments, when the first navigation 291 or the second navigation 293 is selected, the donut chart 400 may also rotate (clockwise or counter-clockwise) to bring the currently selected portion of the donut chart 400 into view. From FIG. 4D, if the user selects the icon associated with the deselect module 312, the tooltip 290 is removed from the display screen and the donut chart 400 is displayed without any portion being selected, as shown in FIG. 4E. Also displayed in FIG. 4E are icons associated with the explore module 352 and the action module 315. When the icon associated with the explore module 352 is selected, the icons associated with the measure module 353, group module 354, filter module 355 and view module 356 are displayed, as shown in FIG. 4F.

Figure 5A:
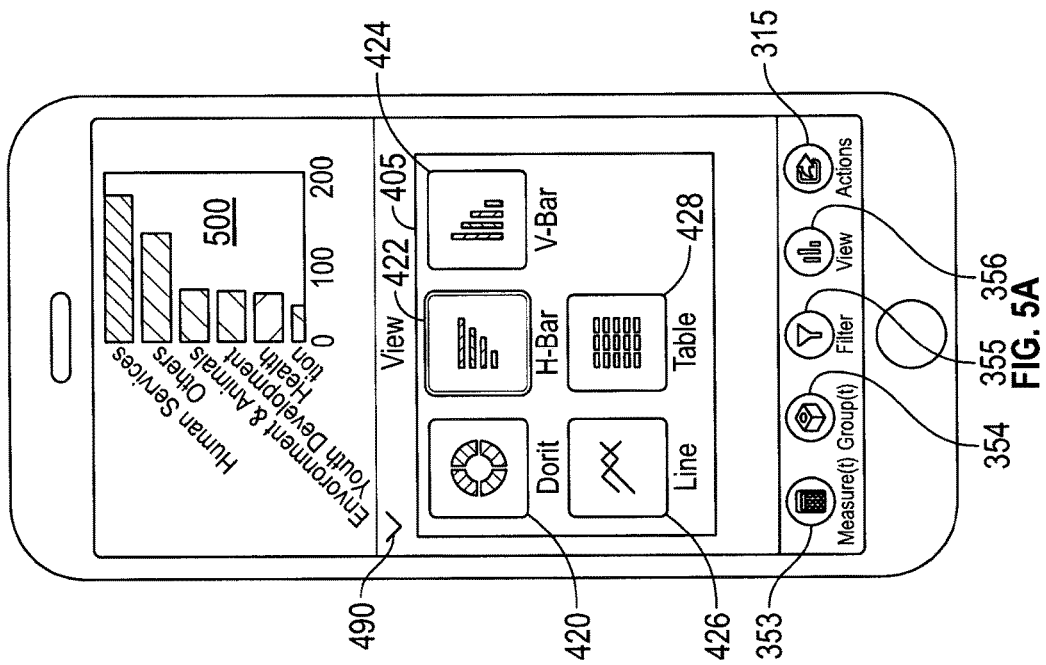
Figure 4G:
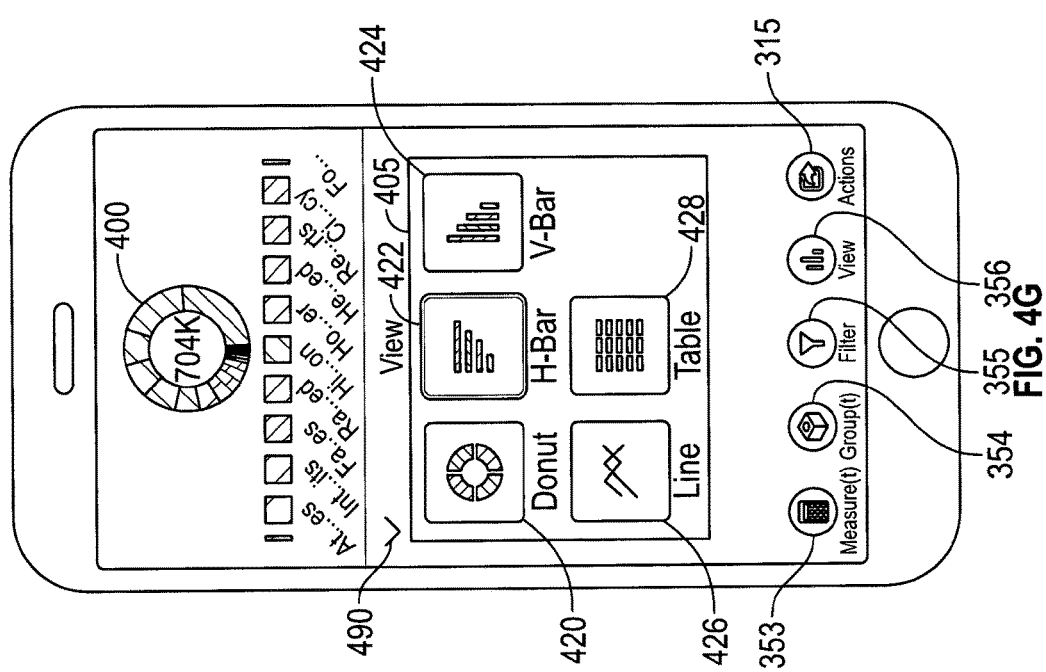

From FIG. 4F, if the user selects the icon associated with the view module 356, a view menu 405 is displayed, as shown in FIG. 4G. The view menu 405 may include options to display information associated with a chart using different chart types. For example, the view menu 405 may include menu options for a donut chart type 420, a horizontal bar chart type 422, a vertical bar chart type 424, a line chart type 426, and a table chart type 428. If a user selects the horizontal bar chart type 422, the information associated with the donut chart 400 is displayed as a horizontal bar chart 500, as shown in FIG. 5A. The view menu 405 may be closed by selecting the close option 490 (shown in FIG. 5A as a downward arrow). When the view menu 405 is open, a smaller version of the current chart (e.g., shrunk to fit the available space but still displaying the same range of data) is visible (shown toward the top of the display screen in FIG. 4G). When the view menu 405 is closed, more space is available on the display screen to display the current chart in a bigger size, as shown in FIG. 5B.

Figure 5C:
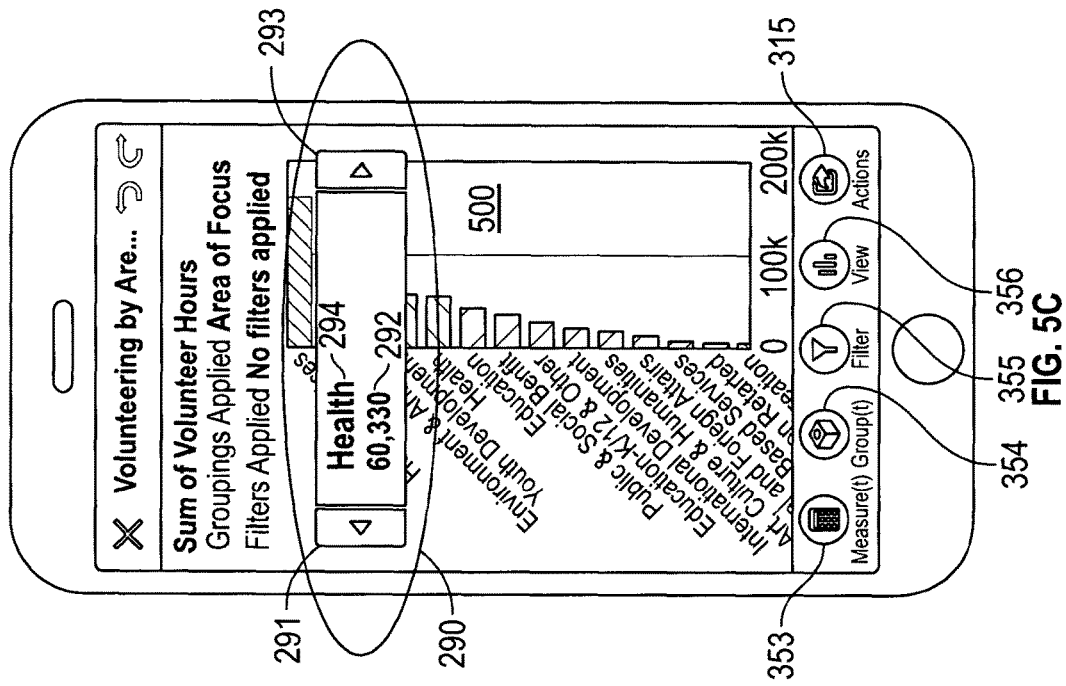
Figure 5B:
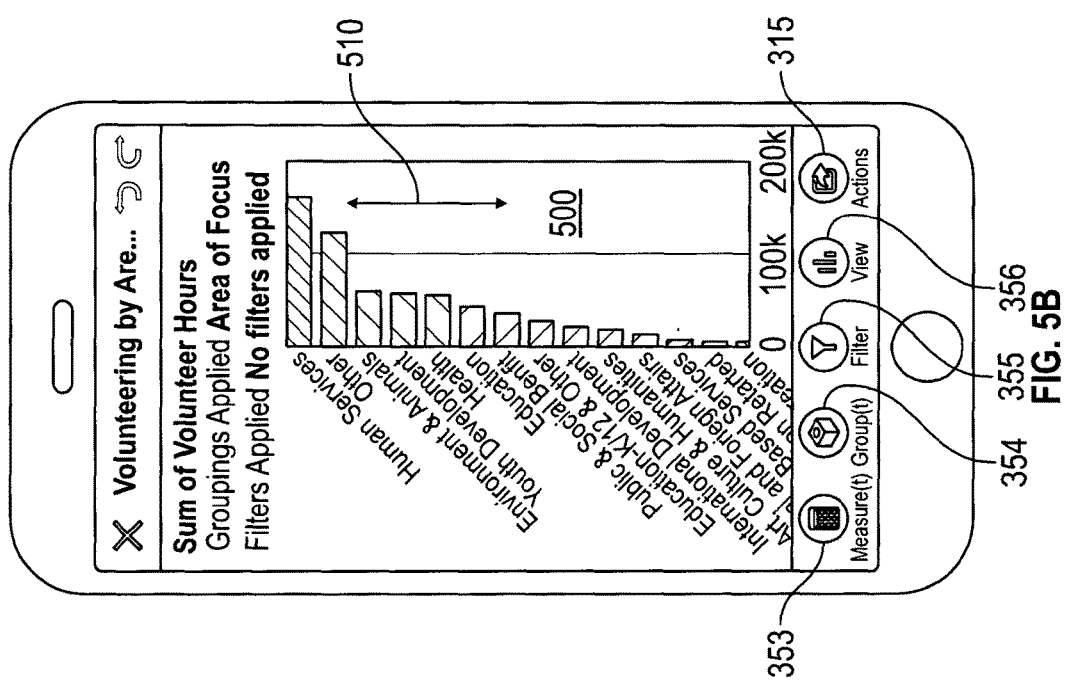
Figure 5E:
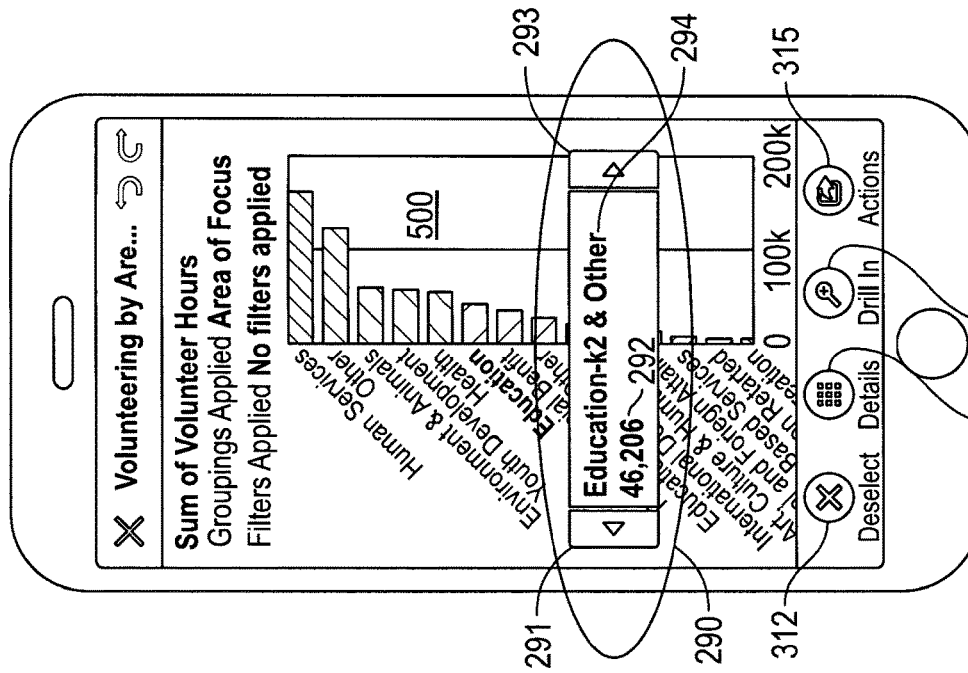
Figure 5D:
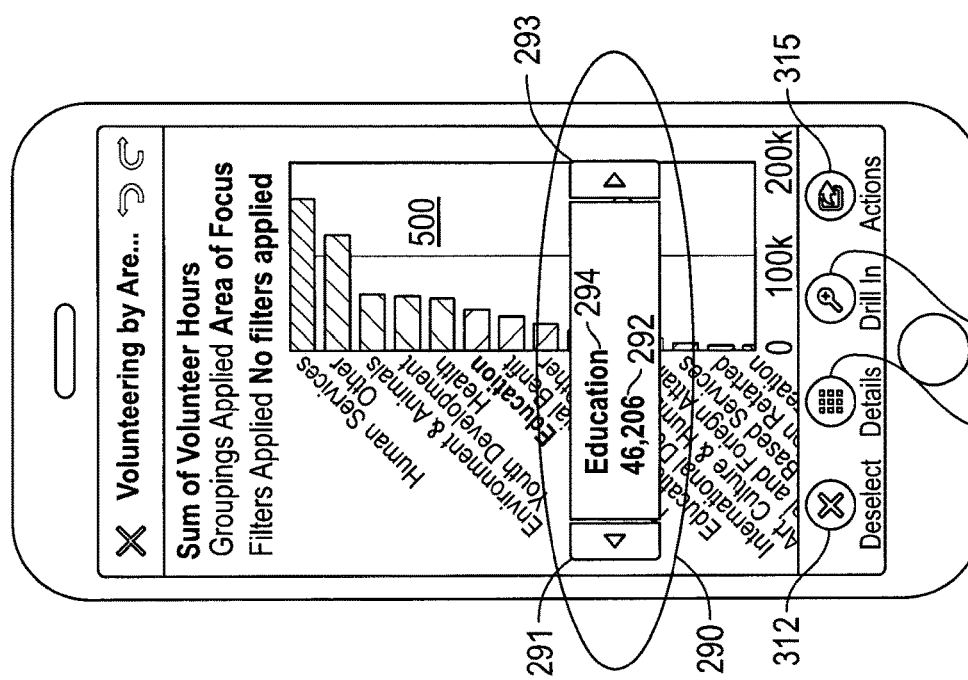

From FIG. 5B, the user may scroll the horizontal bar chart 500 by touching a portion of the horizontal bar chart 500 and swipe generally in a direction shown by the bi-directional arrow 510. When the user selects a portion of the horizontal bar chart 500, the tooltip 290 is displayed, as shown in FIG. 5C. The user may move the tooltip 290 from a current position to another position to enable the user to view any portion of the horizontal bar chart 500 that may be blocked by the tooltip 290. For example, the user may move the tooltip 290 from its position shown in FIG. 5C to a new position shown in FIG. 5D by touching a portion of the tooltip 290 and drag it across the display screen. From any position of the tooltip 290, the user may use the navigation tool to display information associated with different portions of the horizontal bar chart 500, as shown n FIG. 5E. When the label information 294 and/or the value information 292 is longer than can be displayed in whole in the tooltip 290, the label information 294 and/or the value information 292 may be scrolled. For example, the label information 294 and the value information 292 displayed in the tooltip 290 in FIG. 5F are only partially visible. The user may need to scroll the label information 294 and/or the value information 292 such as, for example, scrolling left and scrolling right, to display the other portions of the label information 294 and/or the value information 292.

From FIG. 5F, if the user selects the icon associated with the deselect module 312, the tooltip 290 is removed from the display screen and the horizontal bar chart 500 is displayed without any portion being selected, as shown in FIG. 5G. Also displayed in FIG. 5G are icons associated with the measure module 353, group module 354, filter module 355 and view module 356. From FIG. 5G, if the user selects the icon associated with the view module 356, the view menu 405 is displayed, as shown in FIG. 5H. It may be noticed that only a portion of the horizontal bar chart 500 is visible when the view menu 405 is displayed. When the user selects the line chart type 426, the information associated with the horizontal bar chart 500 is displayed as a line chart 600, as shown toward the top of the display screen in FIG. 6A.

From FIG. 6A, when the user can close the view menu 405 by selecting the close option 490. When the view menu 405 is closed, more space is available on the display screen to display the line chart 600, as shown in FIG. 6B. From FIG. 5B, the user may scroll the line chart 600 by touching a portion of the line chart 600 and swipe generally in a direction shown by the bi-directional arrow 605. When the user selects a portion of the line chart 600, the tooltip 290 is displayed, as shown in FIG. 6C. The user may move the tooltip 290 from a current position to another position to enable the user to view any portion of the line chart 600 that may be blocked by the tooltip 290. For example, the user may move the tooltip 290 from its position shown in FIG. 6C to a new position shown in FIG. 6D by touching a portion of the tooltip 290 and drag it across the display screen. With the tooltip 290, the user may use the navigation tool to display information associated with different portions of the line chart 600, as shown in FIGS. 6D and 6E. It may be noted that portion 650 of the line chart 600 shown in FIG. 6C is highlighted to correspond to the value information 292. The highlighting of the selected portions of the line chart 600 is also shown in FIGS. 6D and 6E. It may be possible to update the label information 294 and the value information 292 by selecting another portion of the line chart 600 such as, for example, by touching the line chart portion, instead of using the navigation tool.

From FIG. 6E, if the user selects the icon associated with the deselect module 312, the tooltip 290 is removed from the display screen and the line chart 600 is displayed without any portion being selected, as shown in FIG. 6F. Also displayed in FIG. 6F are the icons associated with the measure module 353, group module 354, filter module 355 and view module 356.

From FIG. 6F, if the user selects the icon associated with the view module 356, the view menu 405 is displayed, as shown in FIG. 6G. It may be noticed that only a portion of the line chart 600 is visible when the view menu 405 is displayed. When the user selects the vertical bar chart type 424, the information associated with the line chart 600 is displayed as a vertical bar chart 650, as shown toward the top of the display screen in FIG. 6H.

From FIG. 6H, a user may scroll the vertical bar chart 650 by touching a portion of the vertical bar chart 650 and swipe generally in a direction shown by the bi-directional arrow 655. The user may select a portion of the vertical bar chart 650 by touching that portion on the display screen. For example, when the user touches the portion 670 of the vertical bar chart 650, the tooltip 290 is displayed, as shown in FIG. 6I. From any position of the tooltip 290, the user may use the navigation tool to display information associated with different portions of the vertical bar chart 650, as shown in FIGS. 6I, 6J and 6K.

For some embodiments, when a chart to be displayed is a line chart, the chart module 303 (shown in FIG. 3A) is configured to have a capability of providing information regarding the relative density of information in the line chart. For some embodiments, the chart module 303 may determine an appropriate relative line thickness for lines (also referred to as line segments, as shown in FIG. 6L) in a line chart. The line chart may simultaneously show the label information, the value information, and the density of the information by using line thickness for the line segments.

The chart module 303 may determine the density of the information in a particular view and display the line chart using a line thickness that reflect such density of information to enable a user to quickly understand the values being expressed intuitively. For example, as the mobile computing system changes a portion of a line chart being displayed from one portion to another portion, such as in response to a command from a user, the mobile computing system may automatically increases or decreases a thickness of the line segments of the line chart to reflect the density of the information on the display screen 301.

Figure 6M:
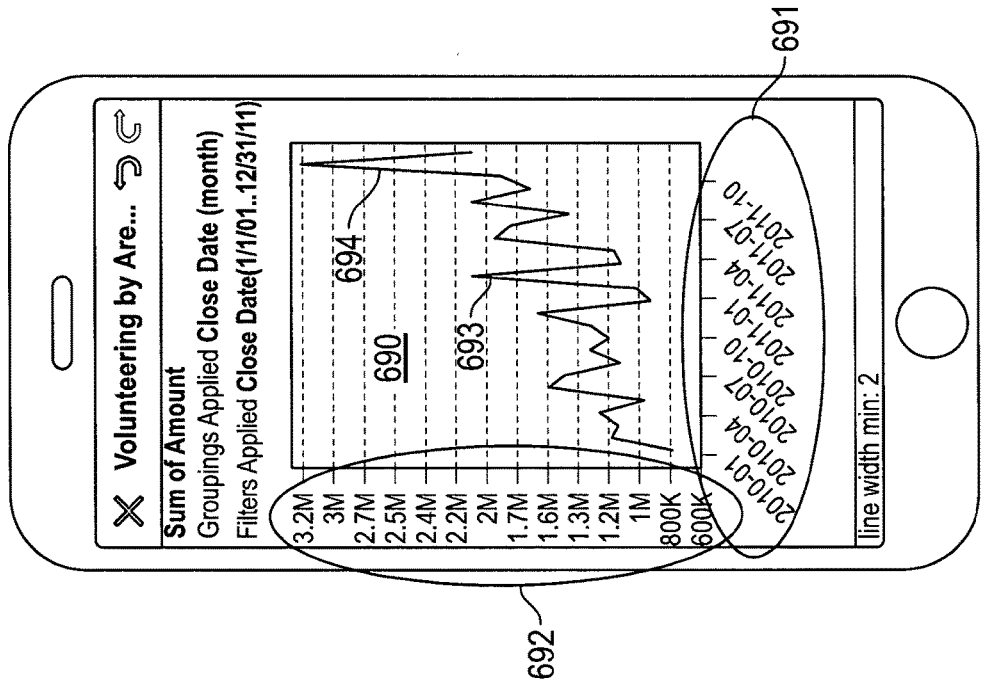
FIGS. 6L through 6N show images of a display screen of a mobile computing system, the images including examples of line charts having line segments with different line thickness, in accordance with some embodiments.
Figure 6L:
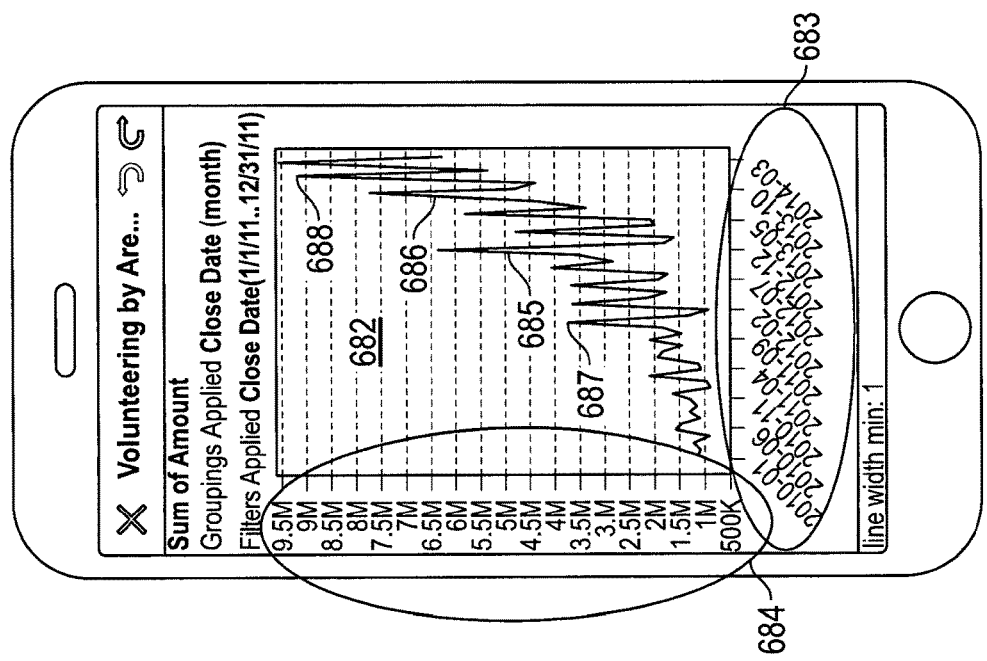
Figure 6N:
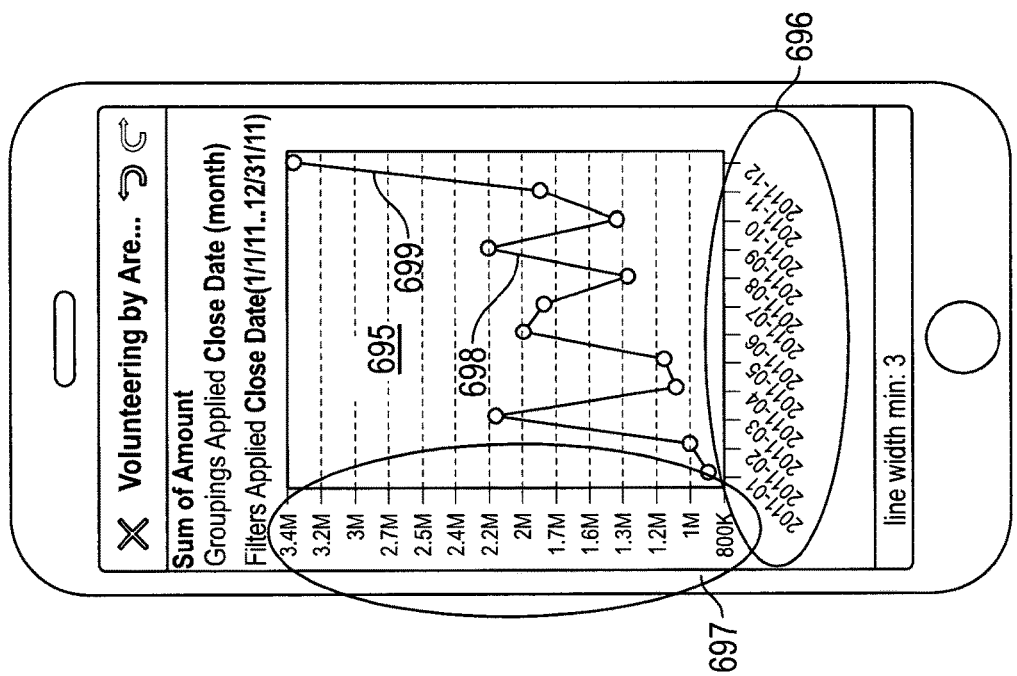

FIGS. 6L, 6M and 6N show examples of line charts having line segments with different line thickness as displayed on a display screen of a mobile computing system, in accordance with some embodiments. The display screens described with these examples are touch sensitive screens. It may be noted that although these examples refer to the first, second and third thickness levels, these thickness levels are not meant to be restrictive and are merely used as examples to show the difference between different levels of thickness. Any two or more levels of thickness may be used. A portion of the line charts may be selected and a tooltip such as the tooltip 290 may be presented to enable a user to view more detail information about the selected portion.

Referring to FIG. 6L, the line chart 682 includes label information 683 and value information 684. The label information 683 in this example shows a date range from January 2010 to March 2014 for a total of 39 months. The value information 684 in this example shows the values for various points of the line chart 682 based on the label information 683. As shown in FIG. 6L, the line chart 682 includes multiple connected line segments such as, for example, line segments 685 and 686. All of the line segments of the line chart 682 are displayed with the same thickness (or width or thickness level). In this example, the thickness level of the line segments in the line chart 682 is referred to as the first thickness level.

For some embodiments, the thickness of the line segments of the line chart 682 may automatically vary depending on the density of the information displayed in the line chart 682. For example, a line chart that depicts a greater density of information has thinner line segments, and a line chart that depicts a lesser density of information has thicker line segments. The thickness of the line segments may be presented as being thinner when there are more data points to be displayed on the display screen such as, for example, when there is a greater data range as shown in the line chart 682 (as analogous to zooming out or viewing from a greater distance). The thickness of the line segments may be presented as being thicker when there are less data points to be displayed on the display screen such as, for example, when a line chart includes a subset of the date range shown in the line chart 682 (as analogous to zooming in or viewing from a closer distance). In this manner, a user is able to see the context of the information by simply viewing the thickness of the line segments in the line chart 682 since the density of the information is reflected in such thickness.

For some embodiments, a graphical user interface (GUI) may be presented to enable a user to vary the thickness of the line segments. The GUI may include a filtering mechanism (e.g., date filtering mechanism) to update the information to be presented in the line chart. For example, the filtering mechanism may enable the user to specify a wider date range resulting in thinner line segments or a narrower data range resulting in thicker line segments. For some embodiments, the varying of the thickness of the line segments may enable a user to comprehend the relative view of the information when the line chart is displayed on a small display screen such as the display screens typically associated with a mobile computing system without necessarily viewing the subsidiary information on the display screen. For example, a line chart representing busy activities for a sale representative in a period of 12 months may have thinner line segments, whereas a line chart representing slow activities for another sale representative in the same 12 months period may have thicker line segments.

For some embodiments, the thickness of the line segments of the line chart 682 may be determined based upon the amount of horizontal space available on the display screen 301 and the number of points (e.g., points 687 and 688) there are in the line chart 682. For some embodiments, if there are relatively more data points and less screen space available to display, then there is greater density of information. As a result, the line segments will be relatively thinner. Conversely, if there are relatively fewer data points and more screen space available to display, then there is lesser density of information. As a result, the line segments will be relatively thicker.

Referring to FIG. 6M, the line chart 690 includes label information 691 and value information 692. The label information 691 in this example shows a date range from January 2010 to October 2011 for a total of 22 months. The value information 692 in this example shows the values for various points of the line chart 690 based on the label information 691. The information included in the line chart 690 is at a lesser density (22 months) than the information included in the line chart 682 (39 months), shown in FIG. 6L. Since both the line chart 682 and the line chart 690 are shown using the same available screen space, the line chart 690 is shown with line segments (e.g., line segments 693 and 694) that are thicker than the line segments (e.g., line segments 685 and 686) of the line chart 682. In this example, the thickness level of the line segments in the line chart 690 is referred to as the second thickness level.

Referring to FIG. 6N, the line chart 695 includes label information 696 and value information 697. The label information 696 in this example shows a date range from January 2011 to December 2011 for a total of 12 months. The value information 697 in this example shows the values for various points of the line chart 695 based on the label information 696. The information included in the line chart 695 is at a lesser density (12 months) than the information included in the line chart 690 (22 months) and the information included in the line chart 682 (39 months). Since both the line chart 690 and the line chart 695 are shown using the same available screen space, the line chart 695 is shown with line segments (e.g., line segments 698 and 699) that are thicker than the line segments (e.g., line segments 693 and 694) of the line chart 690. In this example, the thickness level of the line segments in the line chart 695 is referred to as the third thickness level.

For some embodiments, whenever there is a change or update to the information to be displayed or to the available screen space, the thickness of the line segments in a particular line chart is updated. For some embodiments, a thickness threshold window may be used to determine whether the thickness of the line segments is to be updated when there is an update to the information or an update to the available screen space. For example, when the date range to be displayed in a line chart such as the line chart 682 of FIG. 6L is between 36 months and 48 months, the first thickness level (thin) may be used. Thus when the date range is updated from 38 months to 46 months, the thickness level of the line segments may remain the same. When the date range to be displayed in a line chart such as the line chart 690 of FIG. 6M is between 20 months and 36 months, the second thickness level (thicker) may be used. Thus when the date range is updated from 24 months to 30 months, the thickness level of the line segments may remain the same. When the date range to be displayed in a line chart such as the line chart 695 of FIG. 6N is between 1 month and 20 months, the third thickness level (thickest) may be used. Thus when the date range is updated from 12 months to 16 months, the thickness level of the line segments may remain the same.

Figure 7A:
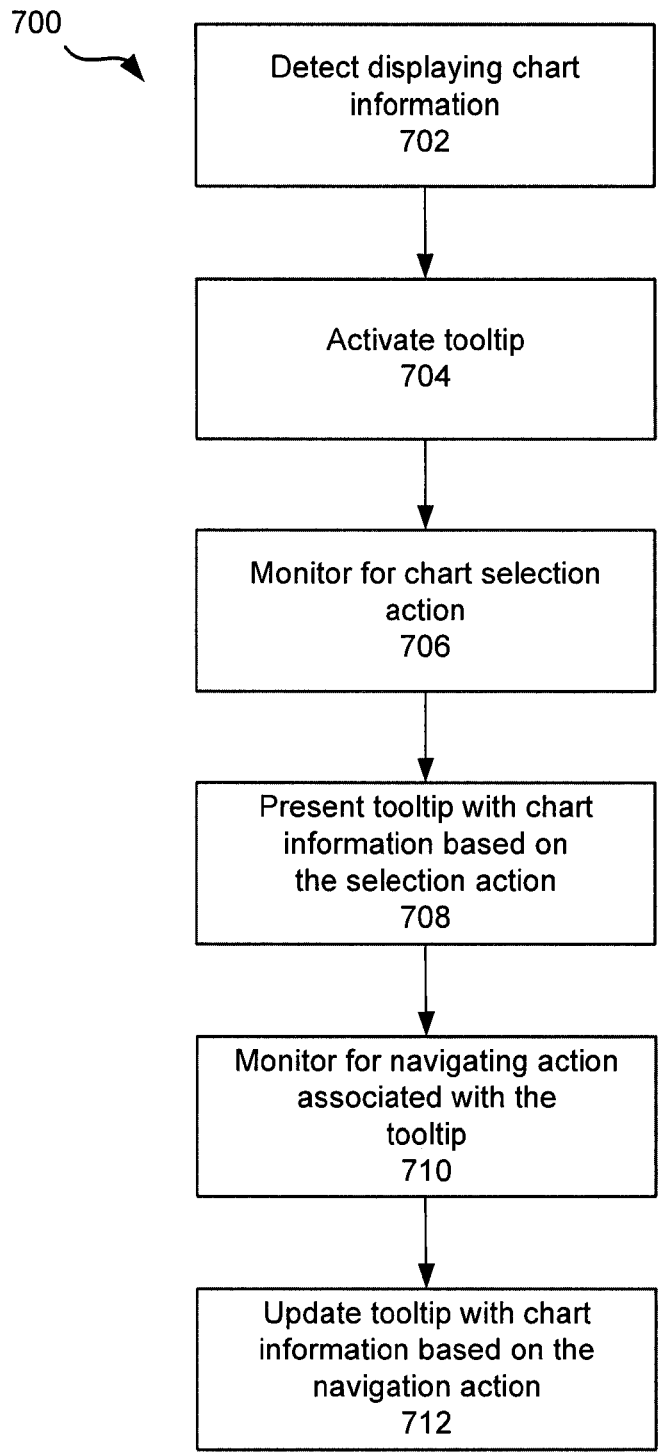
FIG. 7A shows a flowchart of an example process for enabling a tooltip to enable viewing chart information when using a mobile computing system, performed in accordance with some embodiments.
Figure 7:
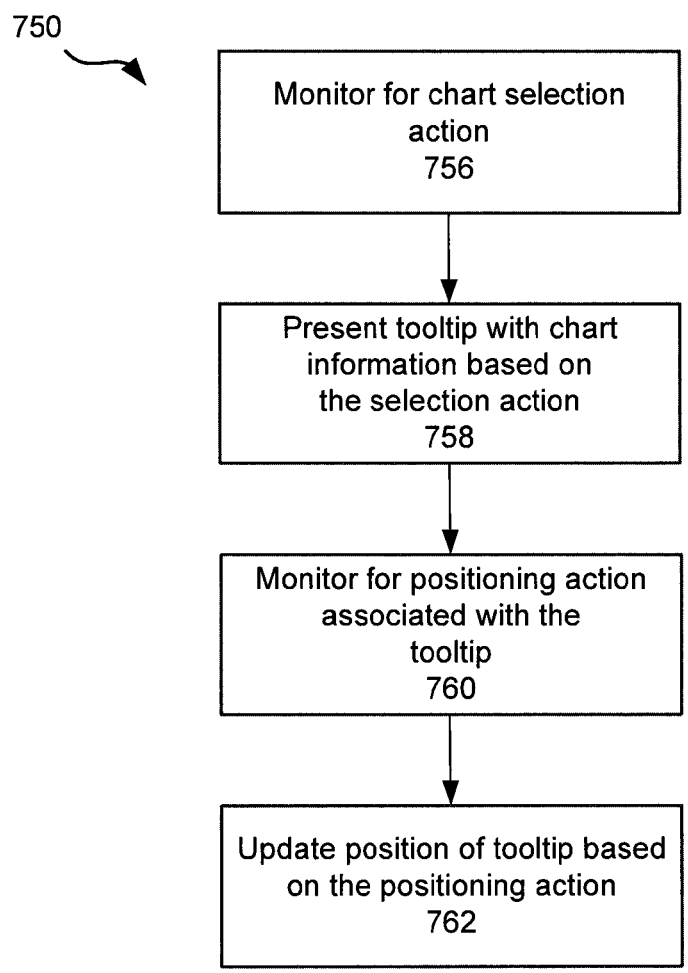
FIG. 7B shows a flowchart of an example process for updating a position of a tooltip to enable viewing chart information when using a mobile computing system, performed in accordance with some embodiments.
FIG. 7C shows a flowchart of an example process for displaying the label and value information in a tooltip using a mobile computing system, performed in accordance with some embodiments.
FIG. 7D shows a flowchart of an example process for displaying a line chart using line segments having thickness based on density of information, in accordance with some embodiments.
Figure 7:
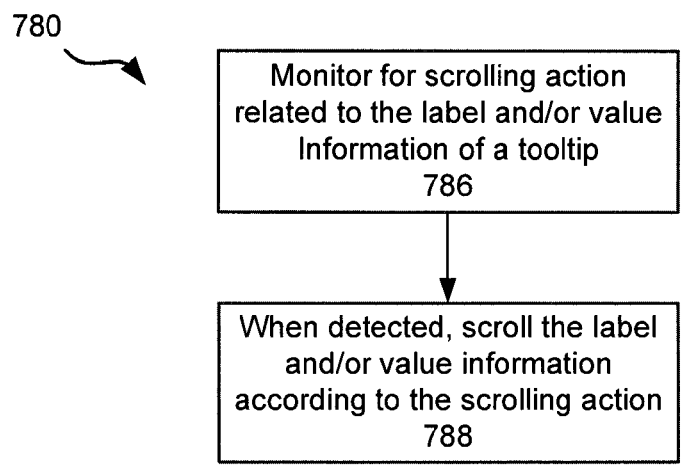

FIG. 7A shows a flowchart of an example process for enabling a tooltip to enable viewing chart information when using a mobile computing system, performed in accordance with some embodiments. The process 700 may be performed by a chart module 303 (shown in FIG. 3A) and is described based on a user or a software initiating an action to cause a chart to be displayed on a display screen of a mobile computing system. At block 702, the chart module 303 detects that a chart is being displayed in the display screen. At block 702, the chart module 303 may optionally activate the tooltip 290 but not necessarily displaying the tooltip 290. At block 706, the chart module 303 may monitor for a chart selection action. For example, the chart selection action occur when the user touches a portion of the chart on the display screen. At block 708, when a chart selection action is detected, the chart module 303 may cause the tooltip 290 to be displayed on the display screen. The tooltip 290 may include the label information 294 and the value information 292 corresponding to the portion of the chart that the user selects. The tooltip 290 may be displayed at a default starting position on the display screen, or it may be displayed at a position relatively close to the selected portion of the chart. At block 710, the chart module 303 may monitor for navigation action. For example, the user may use the navigation tool 298 (shown in FIG. 2E) of the tooltip 290 to navigate from the selected portion of the chart. The navigation may be based on a direction (e.g., previous, next, up, down) provided by the navigation tool 298. At block 712, the chart module 303 may update the tooltip 290 with chart information based on the navigation action. For example, if the user uses a "Next" navigation, the chart information may be based on a next portion of the chart, as determined from a current portion of the chart.

FIG. 7B shows a flowchart of an example process for updating a position of a tooltip to enable viewing chart information when using a mobile computing system, performed in accordance with some embodiments. The process 750 may be performed by a chart module 303 (shown in FIG. 3A) and is described based on a user or a software initiating an action to cause a chart to be displayed on a display screen of a mobile computing system. At block 756, the chart module 303 may monitor for a chart selection action. For example, the chart selection action occur when the user touches a portion of the chart on the display screen. At block 758, when a chart selection action is detected, the chart module 303 may cause the tooltip 290 to be displayed on the display screen. The tooltip 290 may include the label information 294 and the value information 292 corresponding to the portion of the chart that the user selects. At block 760, the chart module 303 may monitor for a dragging action. For example, the dragging action may include an action by a user touching the tooltip 290 and dragging the tooltip 290 in a particular direction. When the dragging action is detected, the chart module 303 may update the position of the tooltip 290 as the user drags the tooltip 290 across the display screen and until the dragging stops. It may be noted that the dragging or positioning of the tooltip 290 does not change the label information 294 and the value information 292.

FIG. 7C shows a flowchart of an example process for displaying the label and value information in a tooltip using a mobile computing system, performed in accordance with some embodiments. The process 780 may be performed by a chart module 303 (shown in FIG. 3A) and is described based on a user or a software initiating an action to cause a chart to be displayed on a display screen of a mobile computing system. The size of the tooltip may sometimes be insufficient to accommodate displaying the label information 294 and/or the value information 292. As such, only a portion of the label information 294 and/or the value information 292 may be visible, and thus scrolling action may be necessary. At block 786, the chart module 303 may monitor for a scrolling action related to the label information 294 and/or the value information 292. For example, the scrolling action may occur when the user touches a portion of the tooltip 290 where the label information 294 and the value information 292 is displayed and swipe in a particular direction. When the scrolling action is detected, the chart module 303 may update the label information 294 and the value information 292 according to the direction of the scrolling action, as shown in block 788.

Figure 7D:
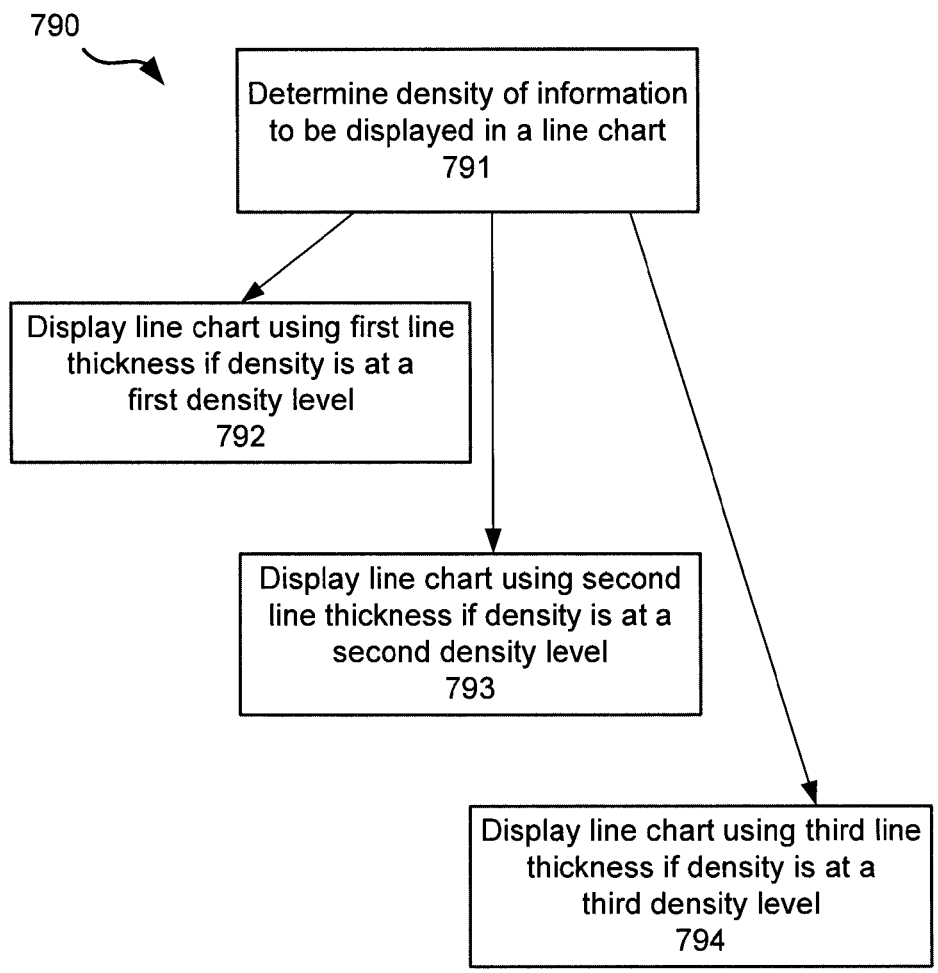

FIG. 7D shows a flowchart of an example process for displaying a line chart using line segments having thickness based on density of information, in accordance with some embodiments. The process 790 may be performed by a chart module 303 (shown in FIG. 3A) and is described based on a user or a program initiating an action to cause a line chart to be displayed on a display screen of a mobile computing system. At block 791, the chart module 303 detects that a line chart is to be displayed in the display screen based on certain label information and value information. The chart module 303 may determine the density of the information to be displayed based on the label information and/or the value information. The chart module 303 may also determine the available screen space to display the line chart. It may be possible that the available screen space to display the line chart is not the entire display screen. Based on one or more of the density of the information and the available screen space, the chart module 303 may display the line chart using a certain line thickness, as shown in blocks 792, 793 and 794. It may be noted the thickness levels described in blocks 792, 793 and 794 are examples only, and the number of available thickness levels may vary depending on the implementations.

Figure 8A:
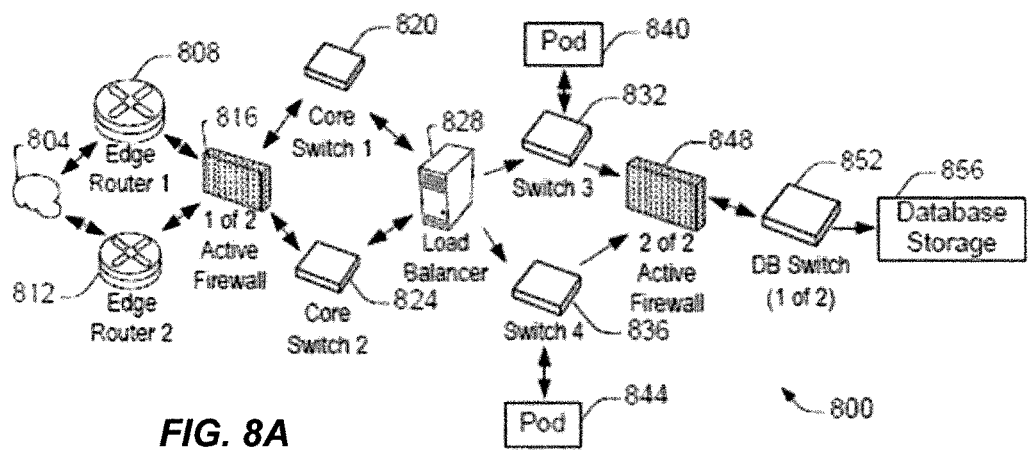
FIG. 8A shows a system diagram 800 illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
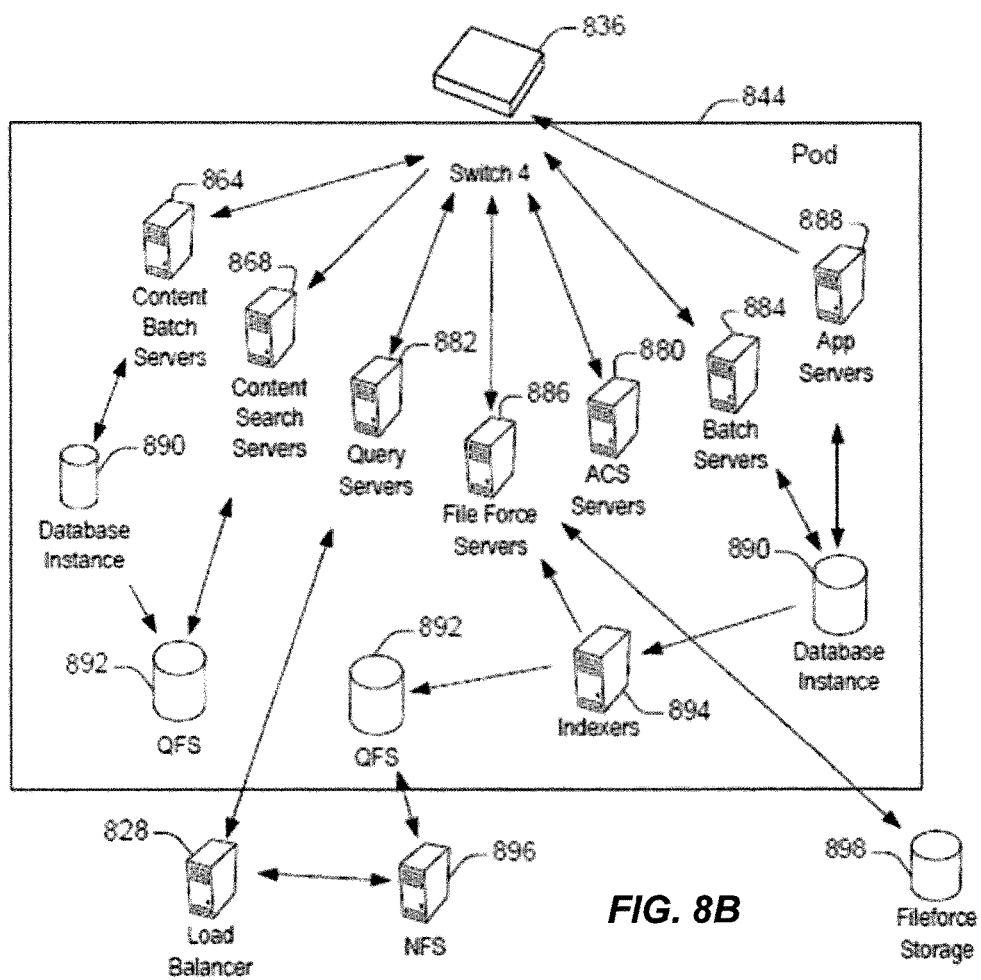
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
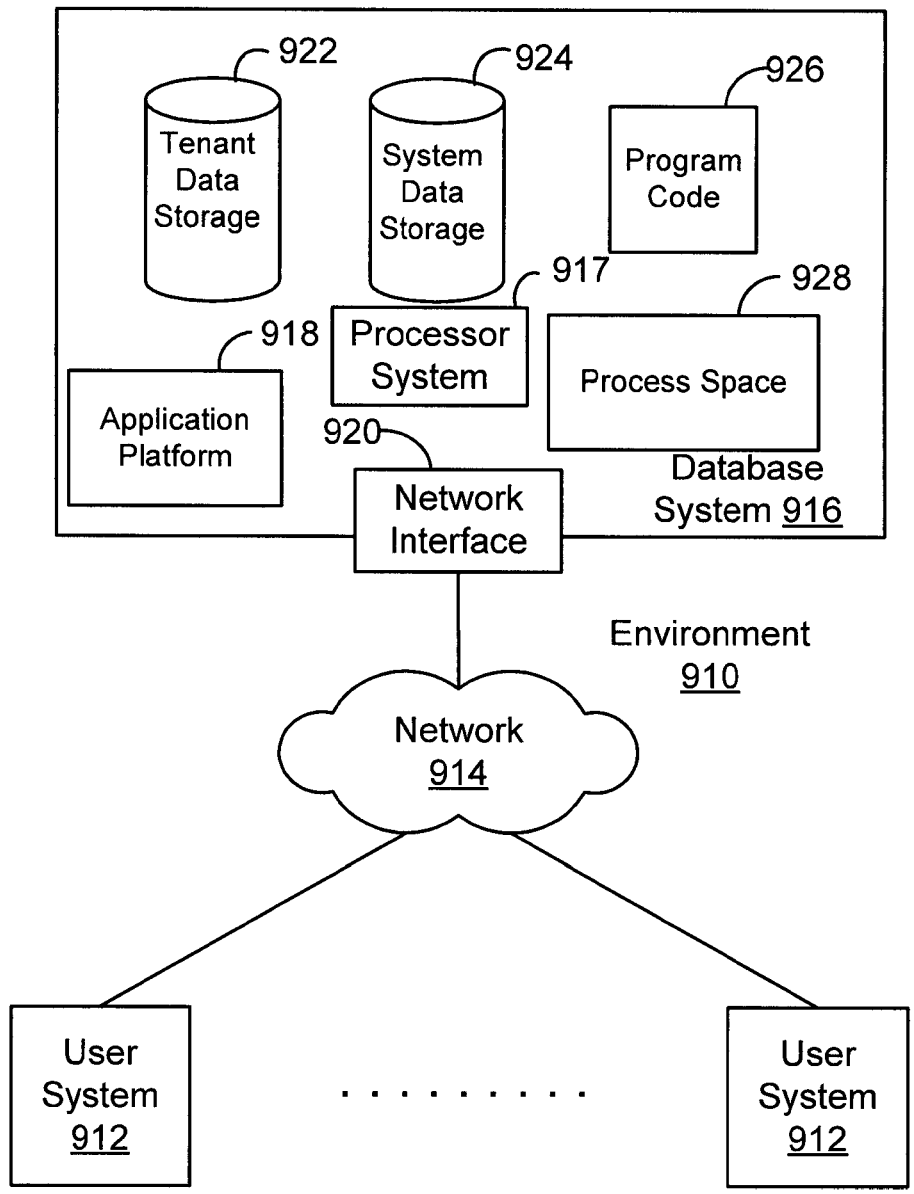
FIG. 9 shows a system diagram 910 illustrating the architecture of a multitenant database environment, in accordance with some embodiments.
Figure 10:
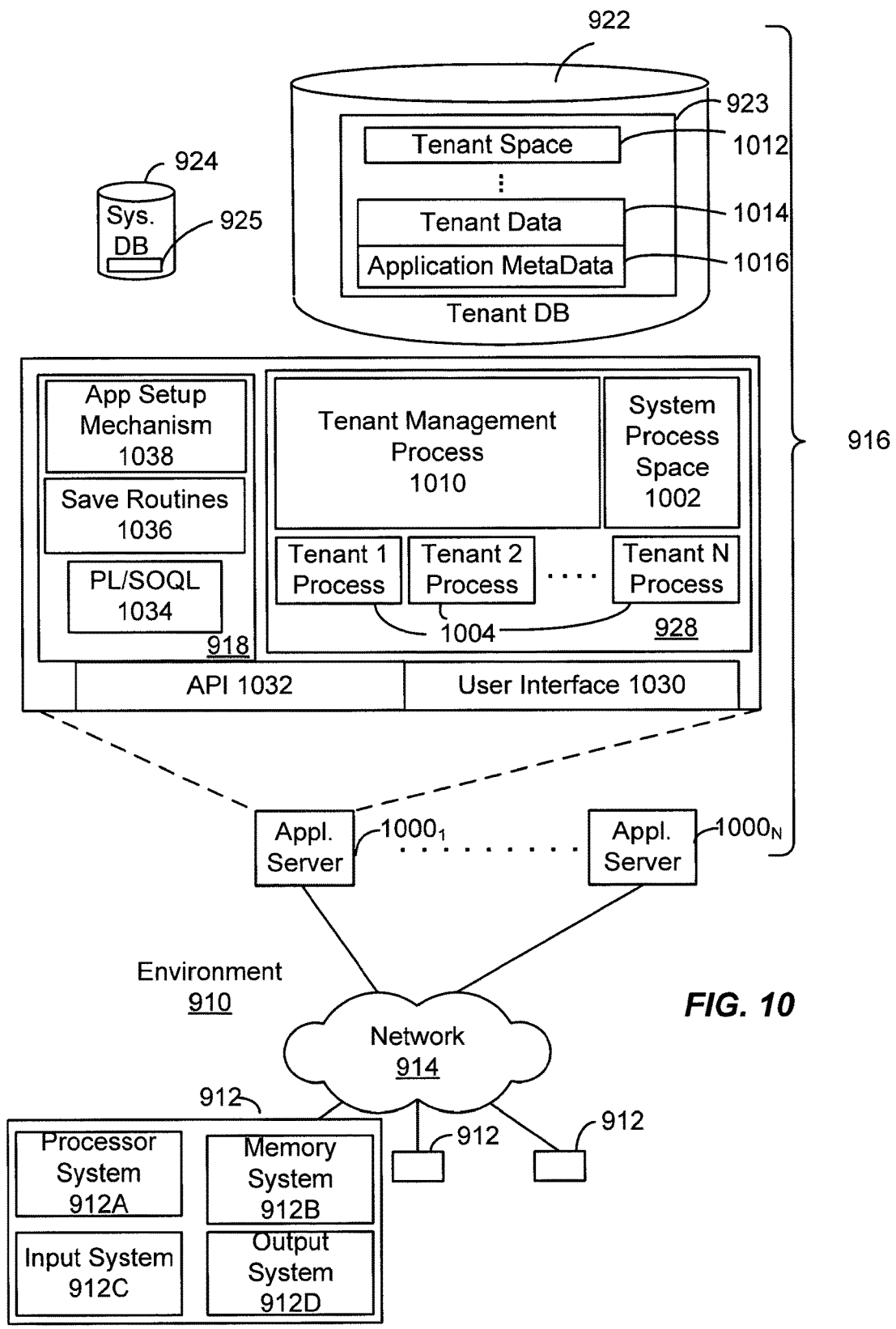
FIG. 10 shows a system diagram 910 further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method comprising:
   displaying a chart and information associated with the chart on a display screen of a mobile computing system using a first chart type, the information including label information and value information; and
   detecting a selection of a portion of the chart on the display screen of a mobile computing system;
   causing a tooltip to be displayed on the display screen of the mobile computing system in response to detecting the selected portion of the chart, the tooltip displaying label information and value information associated with the selected portion of the chart, the tooltip including a navigation tool associated with a remaining portion of the chart, a selection of the navigation tool causing label information and value information associated with the remaining portion of the chart to be displayed within the tooltip that being displayed on the display screen of the mobile computing system.

2. The method of claim 1, wherein the navigation tool includes a first navigation to enable displaying label information and value information associated with a previous portion of the chart relative to the selected portion of the chart and a second navigation to enable displaying label information and value information associated with a next portion of the chart relative to the selected portion of the chart.

3. The method of claim 2 further comprising updating the selected portion of the chart and displaying in the tooltip the label information and value information associated with the selected portion of the chart in response to detecting a navigation action associated with the first navigation or the second navigation.

4. The method of claim 3, wherein the tooltip is displayed at a first position of the display screen, and wherein the tooltip is configured to remain at the first position of the display screen while the first navigation or the second navigation is used to display the label information and the value information associated with the previous portion of the chart or the next portion of the chart.

5. The method of claim 4, further comprising:
   updating a position of the tooltip from the first position to a second position in response to detecting a dragging action associated with the tooltip.

6. The method of claim 5, wherein the tooltip is configured to continue displaying the label information and the value information associated with the selected portion of the chart while its position is updated from the first position to the second position.

7. The method of claim 6, further comprising:
   causing the label information and the value information associated with the selected portion of the chart to be scrollable in the tooltip in response to detecting that one or more of the label information and the value information associated with the selected portion of the chart can only be partially accommodated by the tooltip.

8. The method of claim 7, wherein causing the label information and the value information associated with the selected portion of the chart to be scrollable in the tooltip comprises:
   scrolling one or more of the label information and the value information associated with the selected portion of the chart to be scrolled in a first direction based on detecting a first scrolling action; and
   scrolling one or more of the label information and the value information associated with the selected portion of the chart to be scrolled in a second direction based on detecting a second scrolling action.

9. The method of claim 8, further comprising:
   highlighting the selected portion of the chart in response to detecting the selection of the portion of the chart;
   displaying the chart using the second chart type in response to detecting a selection of a second chart type; and
   stopping the tooltip from being displayed on the display screen in response to detecting an action to close the tooltip.

10. The method of claim 1, further comprising:
   based on the first chart type being a line chart, displaying line segments of the line chart using a thickness level corresponding to one or more of density of the information associated with the line chart and available screen space, wherein there are at least two different thickness levels.

11. An apparatus for display chart information comprising:
   a processor; and
   one or more stored sequences of instructions which, when executed by the processor, cause the processor to:
   display information associated with a chart on a display screen of a mobile computing system using a chart type, the information including label information and value information;
   detect a selection of a portion of the chart on the display screen of a mobile computing system; and
   cause a tooltip to be displayed on the display screen of the mobile computing system in response to detecting the selected portion of the chart, the tooltip displaying label information and value information associated with the selected portion of the chart, the tooltip including a navigation tool associated with a remaining portion of the chart, a selection of the navigation tool causing label information and value information associated with the remaining portion of the chart to be displayed within the tooltip that being displayed on the display screen of the mobile computing system.

12. The apparatus of claim 11, wherein the navigation tool includes a first navigation to enable displaying label information and value information associated with a previous portion of the chart relative to the selected portion of the chart and a second navigation to enable displaying label information and value information associated with a next portion of the chart relative to the selected portion of the chart.

13. The apparatus of claim 12, wherein based on detecting a navigation action associated with the first navigation or the second navigation, the selected portion of the chart is updated and the label information and value information associated with the selected portion of the chart is displayed in the tooltip.

14. The apparatus of claim 13, wherein the tooltip is displayed at a first position of the display screen, and wherein the tooltip is configured to remain at the first position of the display screen while the first navigation or the second navigation is used to display the label information and the value information associated with the previous portion of the chart or the next portion of the chart.

15. The apparatus of claim 14, wherein the instructions, when executed by the processor, further cause the processor to update a position of the tooltip to be updated from the first position to a second position in response to detecting a dragging action associated with the tooltip.

16. The apparatus of claim 15, wherein the tooltip is configured to continue displaying the label information and the value information associated with the selected portion of the chart while its position is updated from the first position to the second position.

17. The apparatus of claim 16, wherein the instructions, when executed by the processor, further cause the processor to cause the label information and the value information associated with the selected portion of the chart to be scrollable in the tooltip in response to detecting that one or more of the label information and the value information associated with the selected portion of the chart can only be partially accommodated by the tooltip.

18. The apparatus of claim 17, wherein the instructions for causing the label information and the value information associated with the selected portion of the chart to be scrollable in the tooltip further comprises instructions to:
   scroll one or more of the label information and the value information associated with the selected portion of the chart to be scrolled in a first direction based on detecting a first scrolling action; and
   scroll one or more of the label information and the value information associated with the selected portion of the chart to be scrolled in a second direction based on detecting a second scrolling action.

19. The apparatus of claim 11, further comprising:
   based on the chart type being a line chart, display line segments of the line chart using a thickness level corresponding to one or more of density of the information associated with the line chart and available screen space, wherein there are at least two different thickness levels.

20. A computer program product comprising a non-transitory computer-readable medium having computer-readable program code embodied therein to be executed by one or more processors the program code including instructions to:
   display information associated with a chart on a display screen of a mobile computing system using a chart type, the information including label information and value information;
   detect a selection of a portion of the chart on the display screen of a mobile computing system; and
   cause a tooltip to be displayed on the display screen of the mobile computing system, the tooltip displaying label information and value information associated with the selected portion of the chart, the tooltip including a navigation tool to enable navigating and updating the tooltip with label information and value information associated with different portions of the chart, the tooltip including a navigation tool associated with a remaining portion of the chart, a selection of the navigation tool causing label information and value information associated with the remaining portion of the chart to be displayed within the tooltip that being displayed on the display screen of the mobile computing system.

* * * * *